US005651100A

United States Patent [19]
Hayashi et al.

[11] Patent Number: 5,651,100
[45] Date of Patent: Jul. 22, 1997

[54] APPROXIMATE REASONING APPARATUS

[75] Inventors: Motoji Hayashi, Takatsuki; Hiroshi Nakajima, Nagaokakyo, both of Japan

[73] Assignee: Omron Corporation, Japan

[21] Appl. No.: 714,020

[22] Filed: Jun. 12, 1991

[30] Foreign Application Priority Data

| | | | |
|---|---|---|---|
| Jun. 28, 1990 | [JP] | Japan | 2-168491 |
| Jun. 28, 1990 | [JP] | Japan | 2-168492 |
| Jun. 29, 1990 | [JP] | Japan | 2-170293 |
| Jul. 25, 1990 | [JP] | Japan | 2-197454 |
| Aug. 23, 1990 | [JP] | Japan | 2-222136 |

[51] Int. Cl.$^6$ ............................................. G06F 9/44
[52] U.S. Cl. ........................... 395/61; 395/3; 395/50; 395/62; 395/68
[58] Field of Search ....................... 395/61, 62, 68, 395/3, 50

[56] References Cited

U.S. PATENT DOCUMENTS

| | | | |
|---|---|---|---|
| 4,628,435 | 12/1986 | Tashiro et al. | 395/61 |
| 4,649,515 | 3/1987 | Thompson et al. | 395/61 |
| 4,777,585 | 10/1988 | Kokawa et al. | 395/61 |
| 4,839,823 | 6/1989 | Matsumoto | 395/61 |
| 4,860,214 | 8/1989 | Matsuda et al. | 395/61 |
| 4,907,167 | 3/1990 | Skeirik | 395/11 |
| 5,103,498 | 4/1992 | Lanier et al. | 395/927 |
| 5,159,667 | 10/1992 | Borrey et al. | 395/934 |

OTHER PUBLICATIONS

Lu et al, "A Machine Learning Approach to the Automatic Synthesis", (AIEDAM) 1987.

Leung et al, "Fuzzy Concepts in Expert Systems", IEEE, Sep.–1988.

Felix et al, "VLSI Chip—Architecture Selection Using Reasoning Based on Fuzzy Logic", 1989 IEEE.

Leung et al, "A Fuzzy Knowledge—Based System Shell – System Z–1" TENCON 87 Seoul, 1987 IEEE.

Primary Examiner—George B. Davis
Attorney, Agent, or Firm—Dickerstein Shapiro Morin & Oshinsky LLP

[57] ABSTRACT

A threshold value is set in advance for each of a number of conclusions. Possibility values of conclusions obtained from an approximate reasoning apparatus are compared with the corresponding threshold values, and a conclusion whose possibility value is equal to or greater than its threshold value is outputted (displayed). When information indicative of an error is entered with regard to a conclusion whose possibility value is equal to or greater than the corresponding threshold value but which actually does not hold true, or a conclusion whose possibility value is less than the corresponding threshold value but which actually does hold true, the threshold value concerning the conclusion that has produced the error is revised dynamically. The weights of conclusions are set. By multiplying the possibility value of a conclusion from an approximate reasoning apparatus by the weight set for this conclusion, a score is calculated for every conclusion. If the order of the obtained scored differs from an order of priority devised by a human being, weight is revised in such a manner that the order of the scores will coincide with the order of priority.

1 Claim, 28 Drawing Sheets

FACTOR f1

FACTOR f2

Fig. 11

| CONCLUSION $c_i$ EXPERT / FACTOR | $ex_l$ | --- | $ex_k$ | --- |
|---|---|---|---|---|
| --- | --- | --- | --- | --- |
| $f_j$ | | | DEGREE OF INCONSISTENCY | |
| --- | --- | --- | --- | --- |

EXPERT ex2

| CONCLUSION | C1 | | |
|---|---|---|---|
| FACTOR | MINIMUM VALUE | MAXIMUM VALUE | FACTOR VALUE |
| f1 | 20 | 40 | 45 |
| ⋮ | ⋮ | ⋮ | ⋮ |

APPROXIMATE REASONING APPARATUS

BACKGROUND OF THE INVENTION

1. Field of the Invention

This invention relates to an approximate reasoning apparatus, especially one which performs approximate reasoning using a membership function given for every conclusion associated with a factor (i.e., an event). Further, the invention relates to an approximate reasoning apparatus having functions for evaluating expert knowledge, combining or synthesizing knowledge and learning knowledge synthesis, etc. Still further, the invention concerns an interface between an approximate reasoning apparatus and human beings. The invention deals also with an apparatus for feeding back information concerning correctness of approximate reasoning, and automatically revising expert knowledge in a knowledge base based upon the information fed back.

2. Description of the Related Art

Approximate reasoning is a method of revising or altering the results of reasoning depending upon information quantities of factors used in order to derive the results of reasoning is known. (For example, see "AN EXPERT SYSTEM WITH THINKING IN IMAGES", by Zhang Hongmin, Preprints of Second IFSA Congress, Tokyo, Jul. 20-25, 1987, p. 765.)

This approximate reasoning method involves using a membership function given for every conclusion relative to a factor to calculate the information quantity of every factor (i.e., the information identifying capability of a factor), and revising or altering the results of reasoning (namely the possibility that a conclusion will hold) depending upon information quantities of factors used in order to derive the conclusion (wherein the revision or alteration involves taking the product of possibility and information quantity), thereby improving the capability to identify the results of reasoning.

In an approximate reasoning apparatus of this kind, the possibility of every conclusion is calculated and then either all possibilities are displayed to inform the human operator or only one or a plurality of the conclusions having the highest possibilities are displayed, thereby providing an output of information relating to a conclusion possibility. Whether or not a conclusion holds good is judged in the same way (for example, by selecting the maximum value of possibility values) with regard to all conclusions.

As a result of the foregoing, certain problems are encountered with the conventional approximate reasoning apparatus. Specifically, since a conclusion having a high possibility does not always hold good, the conventional apparatus is not truly accurate. Further, in a case where the value of a possibility that actually holds good differs for every conclusion, this fact cannot be detected. Another difficulty is that if the possibility that a conclusion will hold good varies dynamically with the passage of time, the conventional apparatus cannot deal with this.

The conventional approximate reasoning apparatus does not take into consideration the weight or significance possessed by a conclusion per se (an example of such weight being the cost and time required for repairs in case of fault diagnosis). Consequently, when the apparatus draws conclusions having almost the same possibility, it is incapable of knowing which conclusion is the most significant. The apparatus cannot detect whether there is a conclusion that should be given priority even though its possibility is not high. Accordingly, it not possible to perform reasoning conforming to the special characteristics of the system (equipment) to which reasoning is being applied. Therefore, in order to adapt approximate reasoning to the characteristics of the system which is the object of reasoning, it is necessary that the knowledge base of the approximate reasoning apparatus be altered.

Still other difficulties arise in the conventional approximate reasoning apparatus. Specifically, since information concerning correctness of the results of reasoning is not fed back, it cannot be determined whether these results are truly correct, whether the knowledge inputted by experts is erroneous and, if it is erroneous, how to correct it. In addition, revision of the knowledge base must be performed with human intervention.

In order to obtain correct results of reasoning regarding a particular factor, it is required that the knowledge be rational as well as the characteristics of the membership function, which is given for every conclusion based upon this knowledge, regarding the factor.

In a case where the results of reasoning deduced from a membership function based upon a constructed knowledge base are erroneous, particularly a case where the knowledge base is the result of the combined knowledge of a plurality of experts, it is required that the user consider which item of expert knowledge is erroneous, namely which item of expert knowledge is actually unfit, and that the user reconstruct the knowledge base by revising the erroneous knowledge and recombine the correct knowledge. This is necessary in order to obtain correct results of reasoning regarding events, namely in order to enhance the rationality of results derived from approximate reasoning.

However, actually locating erroneous knowledge in a knowledge base is a very difficult and troublesome task to perform on the user side. Another drawback is that combining knowledge to reconstruct the knowledge base is time consuming.

SUMMARY OF THE INVENTION

An object of the present invention is to coordinate, for each and every conclusion obtained as the result of reasoning, the value of the possibility of the conclusion and whether the conclusion actually holds true.

Another object of the present invention is to provide an interface in which a conclusion obtained from an approximate reasoning apparatus can be adapted to the characteristics of the system under study, to the convenience of human beings, etc.

Still another object of the present invention is to provide an apparatus that is capable of automatically revising expert knowledge used in approximate reasoning.

Yet another object of the present invention is to provide an approximate reasoning apparatus capable of obtaining more accurate results of reasoning by applying weight to the knowledge of each of a plurality of experts rather than simply averaging the knowledge of these experts and then synthesizing the knowledge.

A further object of the present invention is to provide an approximate reasoning apparatus capable of evaluating ability of experts and of detecting erroneous knowledge by evaluating knowledge of each expert based on correct relation between a factor and conclusion.

A further object of the present invention is to provide an approximate reasoning apparatus capable of deducing accurate results of reasoning at all times by virtue of possessing a learning function which involves taking note of the results of reasoning and a rule, which comprises factors and conclusions, used to arrive at the results of reasoning, automatically altering the weight of an expert who has provided the knowledge that led to the results of reasoning, and recombining (re-synthesizing) knowledge by utilizing such weighting.

A further object of the present invention is to provide an approximate reasoning apparatus improved so as to obtain much more rational conclusions by revising membership functions through learning in the course of actual use of the apparatus, and providing the results of approximate reasoning with greater reasonableness without placing an undue burden upon the user.

An interface apparatus according to the invention for interfacing an approximate reasoning apparatus and a human being is provided for an approximate reasoning apparatus which computes the possibility of a conclusion in dependence upon given input data using knowledge representing the relationship between a plurality of factors (events) and the conclusions thereof. The interface apparatus is characterized by having means for setting a threshold value for each conclusion, and means for comparing a possibility value of a conclusion and the threshold value corresponding to the conclusion, and outputting a conclusion possessing a possibility value equal to or greater than the threshold value.

In a preferred embodiment, the interface apparatus further comprises error-information input means for inputting information relating to a conclusion whose possibility value is equal to or greater than the corresponding threshold value but which actually does not hold true, and a conclusion whose possibility value is less than the corresponding threshold value but which actually does hold true, and means for altering the corresponding threshold value, in a direction which will eliminate an error concerning the conclusion, in accordance with the inputted error information.

The apparatus further comprises means for outputting a warning with regard to a conclusion whose possibility value is equal to or greater than the corresponding threshold value.

Thus, in accordance with this aspect of the present invention, a threshold value is preset for every conclusion. A possibility value of a conclusion obtained from the approximate reasoning apparatus is compared with the corresponding threshold value, and a conclusion whose possibility value is equal to or greater than the threshold value is outputted (displayed). Accordingly, whether a conclusion holds true can be judged, for each and every conclusion, using different criteria (the magnitudes of the threshold values).

In accordance with the present invention, information indicative of an error with regard to a conclusion whose possibility value is equal to or greater than the corresponding threshold value but which actually does not hold true, or a conclusion whose possibility value is less than the corresponding threshold value but which actually does hold true. When this is done, the threshold value regarding the conclusion for which the error occurred is revised in dynamic fashion. Since the threshold value of the possibility that each conclusion will hold true is altered dynamically, effects equivalent to those acquired by performing learning are obtained. In addition, it is possible to improve the accuracy of reasoning without changing the knowledge base itself. For example, in a case where the invention is applied to fault diagnosis of a machine, approximate reasoning conforming to the characteristics of the machine or its characteristics on a particular day becomes possible.

Furthermore, constant monitoring is made possible by outputting a warning or the like when the value of a possibility exceeds the threshold value.

In another aspect of the invention, an interface apparatus for interfacing an approximate reasoning apparatus and a human being is provided for an approximate reasoning apparatus which computes the possibility of a conclusion in dependence upon given input data using knowledge representing the relationship between a plurality of factors (events) and the conclusions thereof. The interface apparatus is characterized by having means for setting a weight for each conclusion, means for calculating a score of each conclusion by performing a prescribed arithmetic operation between the possibility of the conclusion and the weight set for that conclusion, means which, in a case where the sizes of the scores have an order which differs from a degree of priority devised by a human being, is for inputting the degree of priority, and means for altering weight in such a manner that the order of the score sizes agrees with the inputted degree of priority.

Further, an interface apparatus according to the present invention is characterized by having means for setting a weight for each conclusion, means for calculating a score of each conclusion by performing a prescribed arithmetic operation between the possibility of the conclusion and the weight set for that conclusion, and input means for revising the weight in such a manner that if the sizes of the scores have an order which differs from a degree of priority devised by a human being, agreement will be achieved between the order of the score sizes and the inputted degree of priority.

In accordance with the present invention, the score of every conclusion is calculated by weighting the possibilities of the conclusions, which are obtained from an approximate reasoning apparatus. Weight is changed in such a manner that the order of the scores will coincide with the order of priority devised by a human being.

Accordingly, it is possible to obtain a conclusion adapted to the characteristics of the system to which reasoning is being applied, or which conforms to human convenience, without altering the knowledge base of the approximate reasoning apparatus.

The present invention further provides an automatic knowledge revising apparatus for approximate reasoning provided for an approximate reasoning system wherein expert knowledge representing relationships between factors and conclusions is stored in advance and the possibility of a conclusion is computed by applying input data to this knowledge, the revising apparatus comprising validity information input means for inputting information indicative of correctness of a conclusion, memory means for cumulatively storing inputted factor-value data with regard to the conclusion of which the information indicative of correctness is input, inconsistency calculating means for calculating degree of inconsistency between factor-value data stored in the memory means with regard to a prescribed conclusion and expert knowledge stored with regard to the same conclusion, and means for revising the expert knowledge by the factor-value data in dependence upon the calculated degree of inconsistency.

In accordance with the present invention, information indicative of the correctness of the results of reasoning is inputted by a human being (or automatically), the history of the inputted information is preserved, and in accordance with this historical information, an expert knowledge related to the particular conclusion is revised automatically. As a result, expert knowledge can be revised automatically, more precise results of reasoning can be obtained, and it is no longer necessary to revise the knowledge base through human intervention.

Further, the present invention provides an synthesimate reasoning apparatus having knowledge synthesizing means for combining the knowledge of a plurality of experts into a single body of knowledge, the apparatus comprising input means for inputting the knowledge of each expert and a corresponding weight, synthesizing means for synthesizing knowledge by combining the knowledge of each expert weighted using the weight inputted by the input means, and memory means for storing the knowledge synthesized by the synthesizing means.

Thus, the approximate reasoning apparatus according to this aspect of the invention is adapted to eliminate deficiencies in knowledge owing to differences in ability among a number of experts.

Further, the invention provides an approximate reasoning apparatus comprising input means for inputting a correct factor and conclusion, knowledge evaluating computing means for evaluating the knowledge of an expert by comparing the correct factor and conclusion inputted by the input means and the knowledge of the expert, memory means for storing results of evaluation performed by the knowledge evaluating computing means, and display means for displaying the results of evaluation stored in the memory means.

Thus, the apparatus is adapted to evaluate the knowledge of an expert from a correct conclusion regarding a certain factor (event). This makes it possible to extract the weaknesses of an expert for the purpose of eliminating differences in expert ability. This in turn makes possible the training of experts and the detection of erroneous knowledge.

Still further, the invention provides an approximate reasoning apparatus comprising input means for inputting a decision regarding the correctness of a result of reasoning performed based upon knowledge from a plurality of experts, selecting means for selecting, based upon the decision regarding correctness inputted by the input means, which knowledge of an expert among the plurality thereof is to have its weight altered, arithmetic means for calculating a new weight for the knowledge of the expert selected by the selecting means, memory means for storing the new weight for the knowledge of the expert calculated by the arithmetic means, and knowledge re-synthesizing means for automatically re-synthesizing knowledge based upon the new weight for the knowledge of the expert calculated by the arithmetic means.

Thus, the apparatus is designed to have a learning function in which the weight of an expert is calculated automatically merely by inputting the correctness of the result of reasoning from the input means and resynthesizing knowledge using the calculated weight. Accordingly, more correct results of reasoning can be derived.

According to another aspect of the present invention, there is provided an approximate reasoning apparatus for performing approximate reasoning using a membership function given for every conclusion associated with a factor, comprising conclusion-suitability information input means for inputting information relating to whether or not a conclusion obtained as the result of approximate reasoning is a suitable conclusion, and membership-function revising means for revising the membership function, based upon the information inputted by the conclusion-suitability information input means, for the purpose of enhancing the suitability of the result of approximate reasoning.

In accordance with this aspect of the invention, a membership function is revised automatically by the membership-function revising means based upon the information relating to the suitability of the result of reasoning from the input means. This makes it possible to obtain more suitable results of reasoning.

The revision of the membership function for the purpose of improving the suitability of the result of approximate reasoning can be performed in accordance with a defined algorithm determined in conformity with the algorithm used to create the membership function. For example, in a case where a membership function is created based upon a mean value of minimum values, a standard deviation of the minimum values, a mean value of maximum values and a standard deviation of the maximum values in a knowledge base obtained by combining the knowledge of a plurality of experts, the mean value of the minimum values, the standard deviation of the minimum values, the mean value of maximum values and the standard deviation of the maximum values in the knowledge base should be revised, in dependence upon the information relating to the suitability of the result of reasoning from the input means, in accordance with a prescribed algorithm for improving the suitability of the result of reasoning.

In this approximate reasoning apparatus, a membership function is revised automatically by the membership-function revising means based upon information relating to the suitability of the result of reasoning inputted by the input means, and the revision improves the suitability of the result of reasoning. Accordingly, even if the suitability of the membership function initially created is somewhat low, the suitability improves itself by the learning that accompanies use. Thus, it is no longer necessary for the user to revise membership functions.

Accordingly, in a case where a membership function is created based upon a knowledge base which is a combination of the knowledge possessed by a plurality of experts, the user no longer needs to update and or reconstruct the knowledge base. For example, in a situation where the approximate reasoning apparatus is used in fault diagnosis, the reliability of the knowledge base initially created may be somewhat low. Nevertheless, owing to learning which takes place during the diagnostic process, the knowledge base is automatically updated to a highly reliable one that reflects the special characteristics of the equipment undergoing diagnosis. Accordingly, the user is no longer required to perform maintenance on the knowledge base. In addition, when there are several machines to be diagnosed, for example, the same knowledge base may be used initially for each machine. Nevertheless, as the individual diagnosis of each machine progresses, the particular knowledge base is updated to one suited to the special characteristics of each machine automatically with the passage of time or in accordance with the way in which the machine is used by the operator. This makes possible highly reliable fault diagnosis suited to each machine.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 11 shows an example of a degree-of-inconsistency data file;

DESCRIPTION OF THE PREFERRED EMBODIMENTS

Figure 1:
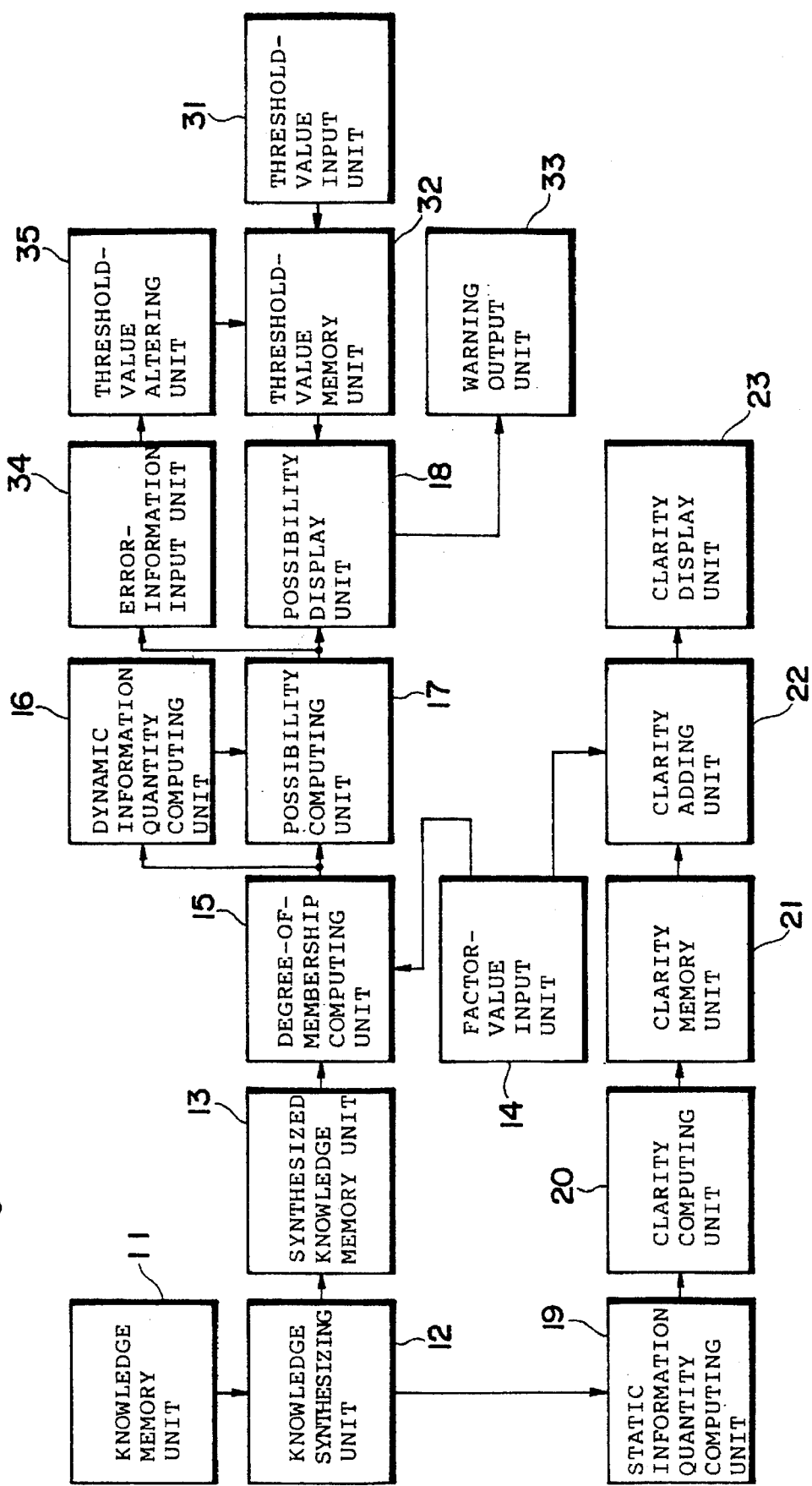
FIG. 1 is a block diagram illustrating an example of the overall construction of an approximate reasoning apparatus and interface apparatus according to a first embodiment of the present invention.

I. FIRST EMBODIMENT (1) Overall construction of approximate reasoning apparatus and interface apparatus FIG. 1 is a block diagram illustrating an example of the overall construction of an approximate reasoning apparatus and interface apparatus according to the first embodiment of the present invention. The approximate reasoning apparatus comprises a knowledge memory unit 11, a knowledge synthesizing unit 12, a synthesized knowledge memory unit 13, a factor-value input unit 14, a degree-of-membership computing unit 15, a dynamic information quantity computing unit 16, a possibility computing unit 17, a static information quantity computing unit 19, a clarity computing unit 20, a clarity memory unit 21, a clarity adding unit 22, and a clarity display unit 23.

The interface apparatus includes a possibility display unit 18, a threshold-value input unit 31, a threshold-value memory unit 22, a warning output unit 33, an error-information input unit 34 and a threshold-value altering unit 35.

These units will now be described in detail taking fault diagnosis as an example.

(2) Knowledge memory unit

The knowledge memory unit 11 stores knowledge, which has been inputted by an expert or the like, in a form which indicates the relationship between factors (symptoms resulting from fault, results of measurement, etc.) and a conclusion (the type of fault, etc.). This unit is capable of storing the knowledge of a plurality of experts.

Examples of the knowledge of two experts $ex_1$, $ex_2$ stored in the knowledge memory unit 11 are illustrated below in the form of rules.

Expert $ex_1$:

If $20 \leq f_1 \leq 60$, $0 \leq f_2 \leq 40$, then $c_1$     (1)

If $40 \leq f_1 \leq 80$, $60 \leq f_2 \leq 100$, then $c_2$     (2)

Expert $ex_2$:

If $30 \leq f_1 \leq 50$, $10 \leq f_2 \leq 30$, then $c_1$     (3)

If $50 \leq f_1 \leq 70$, $70 \leq f_2 \leq 90$, then $c_2$     (4)

Here $f_1$ and $f_2$ are factors, which shall be referred to as factor 1 and factor 2, respectively, hereinafter.

Further, a, b expressed such that $1 \leq f_1 \leq b$ holds shall be referred to as minimum and maximum values, respectively, hereinafter.

The foregoing rules become as follows for each expert when expressed in the form of a table:

TABLE 1

EXPERT $ex_1$

| | CONCLUSION | | | |
|---|---|---|---|---|
| | $c_1$ | | $c_2$ | |
| FACTOR | MINIMUM VALUE | MAXIMUM VALUE | MINIMUM VALUE | MAXIMUM VALUE |
| f1 | 20 | 60 | 40 | 80 |
| f2 | 0 | 40 | 60 | 100 |

TABLE 2

EXPERT $ex_1$

| | CONCLUSION | | | |
|---|---|---|---|---|
| | $c_1$ | | $c_2$ | |
| FACTOR | MINIMUM VALUE | MAXIMUM VALUE | MINIMUM VALUE | MAXIMUM VALUE |
| f1 | 30 | 50 | 50 | 70 |
| f2 | 10 | 30 | 70 | 90 |

$$m_{min} = \frac{20+30}{2} = 25 \quad (7)$$

$$m_{max} = \frac{60+50}{2} = 55 \quad (8)$$

The standard deviation $\sigma_{min}$ of the minimum values and the standard deviation $\sigma_{max}$ of the maximum values are calculated.

$$\sigma_{min} = \left( \frac{20^2 + 30^2}{2} - m_{min}^2 \right)^{1/2} = 5 \quad (9)$$

$$\sigma_{max} = \left( \frac{60^2 + 50^2}{2} - m_{max}^2 \right)^{1/2} = 5 \quad (10)$$

When such processing for combining the knowledge of the experts is carried out for all minimum and maximum values of each factor participating in each conclusion with regard to the above-mentioned rules [Eqs. (1) through (4)], the following table is obtained:

TABLE 3

| | CONCLUSION | | | | | | | |
|---|---|---|---|---|---|---|---|---|
| | $c_1$ | | | | $c_2$ | | | |
| | MINIMUM VALUE | | MAXIMUM VALUE | | MINIMUM VALUE | | MAXIMUM VALUE | |
| FACTOR | AV. VALUE | STAND. DEV. | AV. VALUE | STAND. DEV. | AV. VALUE | STAND. DEV. | AV. VALUE | STAND. DEV. |
| f1 | 25 | 5 | 55 | 5 | 45 | 5 | 75 | 5 |
| f2 | 5 | 5 | 35 | 5 | 65 | 5 | 95 | 5 |

(3) Knowledge synthesizing unit

The knowledge synthesizing unit 12 combines the knowledge of the plurality of experts, which has been stored in the knowledge memory unit 11, into a single body of knowledge.

Though there are various methods of synthesizing knowledge, here the average value and standard deviation of a plurality of experts are calculated with regard to the maximum and minimum values of each factor participating in each conclusion.

Knowledge synthesizing processing will now be described taking as an example knowledge which derives the conclusion $c_1$ from the factor $f_1$ of the two experts mentioned above.

When rules for obtaining conclusion 1 ($c_1$) from factor 1 ($c_1$) are extracted from the above-mentioned rules [Eq. (1) and Eq. (3)], they are expressed as follows:

Expert $ex_1$: if $20 \leq f_1 \leq 60$ then $c_1$ (5)

Expert $ex_2$: if $30 \leq f_1 \leq 50$ then $c_1$ (6)

The average value $m_{min}$ of the minimum values and the average value $m_{max}$ of the maximum values are calculated.

Generally, in approximate reasoning, a membership function is given for a factor. As one example, a method will be described in which a membership function is obtained by a Gaussian distribution using the knowledge of experts combined as set forth above.

A membership function is expressed by the following equation using the average value $m_{min}$ of minimum values, the average value $m_{max}$ of maximum values, the standard deviation $\sigma_{min}$ of minimum values and the standard deviation $\sigma_{max}$ of maximum values:

$$\Phi(x) = \text{Gauss}\left( \frac{x - m_{min}}{\sigma_{min}} \right) - \text{Gauss}\left( \frac{x - m_{max}}{\sigma_{max}} \right) \quad (11)$$

where x: value of data inputted to factor $\Phi(x)$: degree to which input data belongs to factor (degree of membership)

Gauss (x): value of Gaussian distribution in input x

Figure 2:
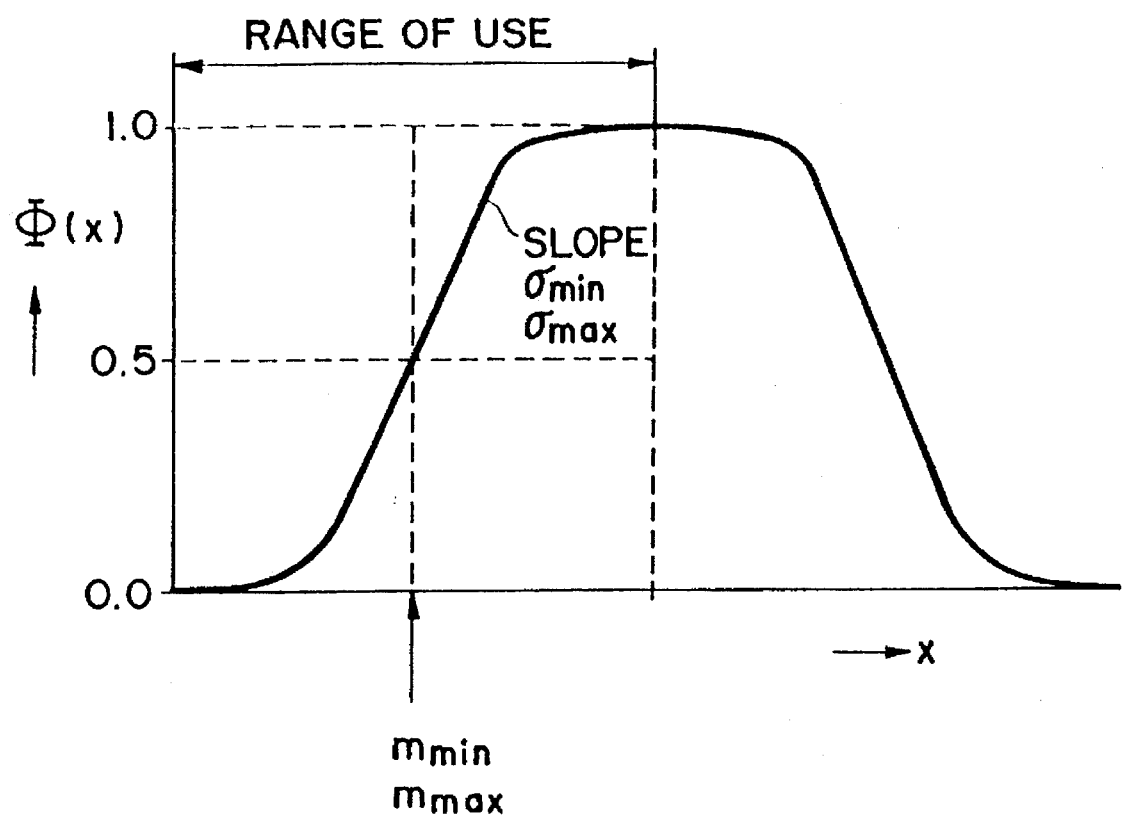
FIG. 2 is a graph depicting a Gaussian distribution.

FIG. 2 illustrates an example of a Gaussian distribution. In this Gaussian distribution, only the left half is used in order to form the membership function. The position of x in $\Phi(x)=0.5$ is decided by $m_{min}$ or $m_{max}$, and the slope is decided by $\sigma_{min}$ or $\sigma_{max}$.

Figure 3A:
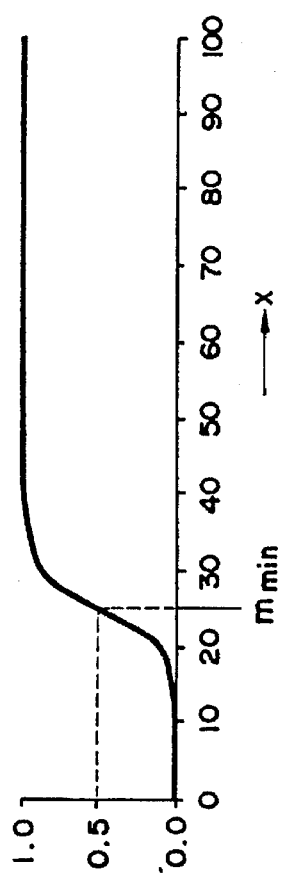
FIGS. 3a, 3b and 3c are graphs showing the manner in which a membership function is formed.
Figure 3B:
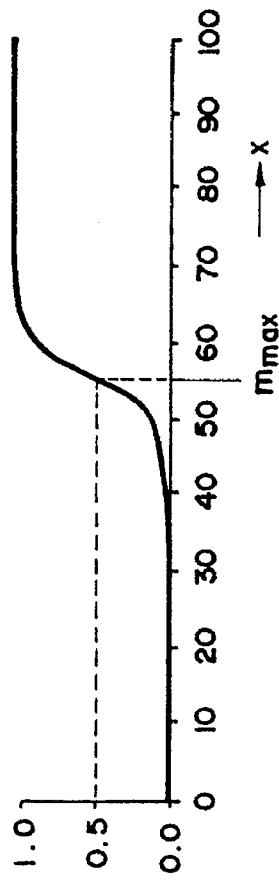
Figure 3C:
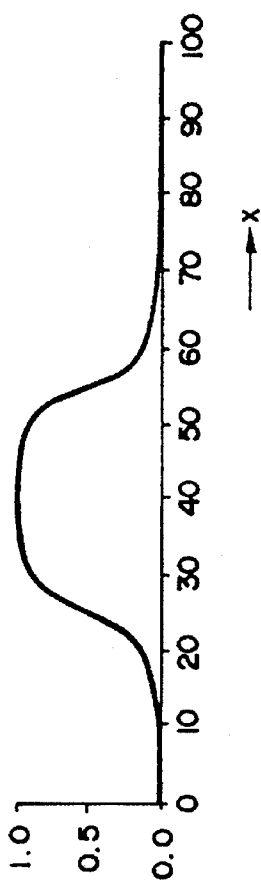

As one example, a membership function for obtaining the conclusion $c_1$ from factor $f_1$ is formed as in the manner of FIG. 3c from FIG. 3a using a value calculated from Eq. (7) through Eq. (10). In this case, Eq. (11) becomes as follows:

$$\Phi(x) = \text{Gauss}\left(\frac{x-25}{5}\right) - \text{Gauss}\left(\frac{x-55}{5}\right) \tag{12}$$

FIG. 3a represents the first term on the right side of Eq. (11) or (12), FIG. 3b represents the second term on the right side of Eq. (11) or (12), and FIG. 3c represents the result of subtracting the second term from the first term, namely a membership function expressed by Eq. (11) or (12).

Figure 4A:
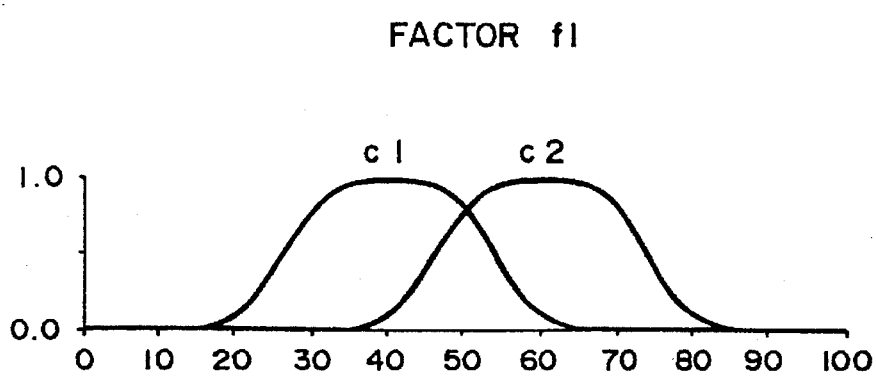
FIGS. 4a and 4b are graphs illustrating membership functions obtained for each factor.
Figure 4B:
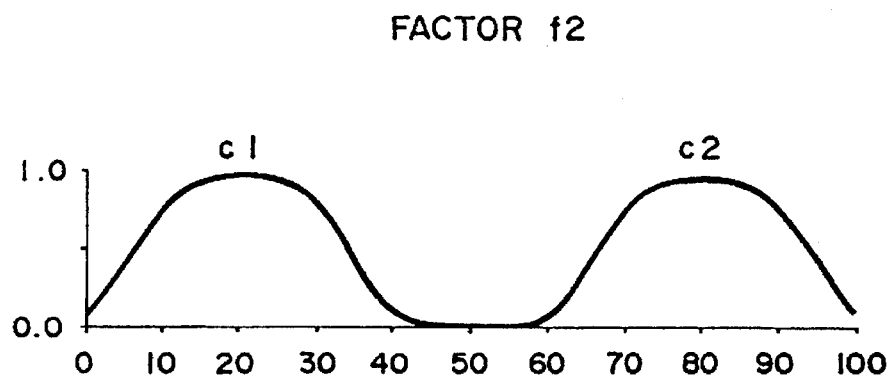

FIGS. 4a and 4b illustrate examples of membership functions for obtaining the conclusions $c_1$, $c_2$ with regard to the factors $f_1$, $f_2$ formed based upon the combined knowledge shown in Table 3.

(4) Synthesized knowledge memory unit

The synthesized knowledge memory unit 13 stores the average values and standard deviation values, which have been calculated by the knowledge synthesizing unit 12, in the form shown in Table 3. Since the combining of knowledge is not required to be carried out whenever reasoning is performed, the calculated results are thus stored in advance. Then, by reading out the values from the memory unit 13 and using them whenever reasoning is performed, reasoning processing can be executed at high speed.

(5) Factor-value input unit

The factor-value input unit 14 is for reading in input data, which is entered for every factor, from a device undergoing fault diagnosis, a keyboard, a communication interface device, a memory, a file, etc. The inputted data is applied to the degree-of-membership computing unit 15. In addition, the factor-value input unit 14 provides the clarity adding unit 22 with information indicating whether data relating to each factor has been entered.

(6) Degree-of-membership computing unit

The degree-of-membership computing unit 15 calculates the degree to which the data inputted from the factor-value input unit 14 belongs to each membership function (or conclusion). More specifically, the degree of membership is obtained as $\Phi(x)$ by substituting the input data as the variable x on the right side of Eq. (11). Of course, it is not absolutely necessary to use an arithmetic expression of this kind.

(7) Dynamic information computing unit 16 and static information computing unit 19

Let $x_1$ represent the factor value (input data) of factor $f_1$, and let $x_2$ represent the factor value of factor $f_2$. These items of data are inputted from the factor-value input unit 14.

Figure 5A:
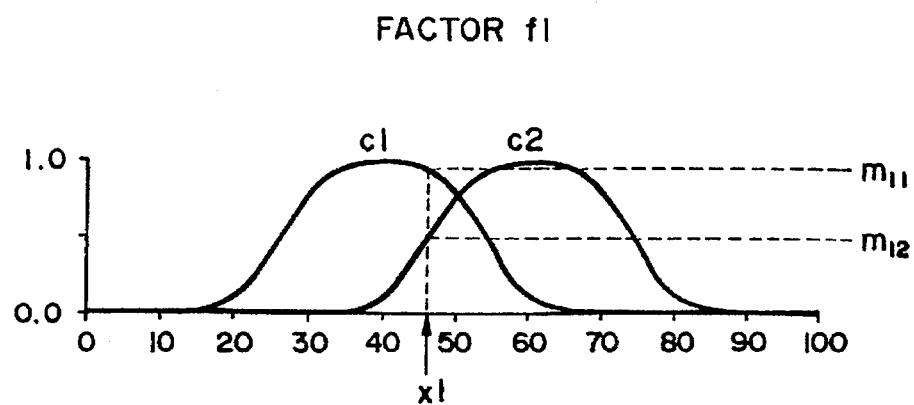
FIGS. 5a and 5b are graphs illustrating the manner in which degree of membership is obtained.
Figure 5B:
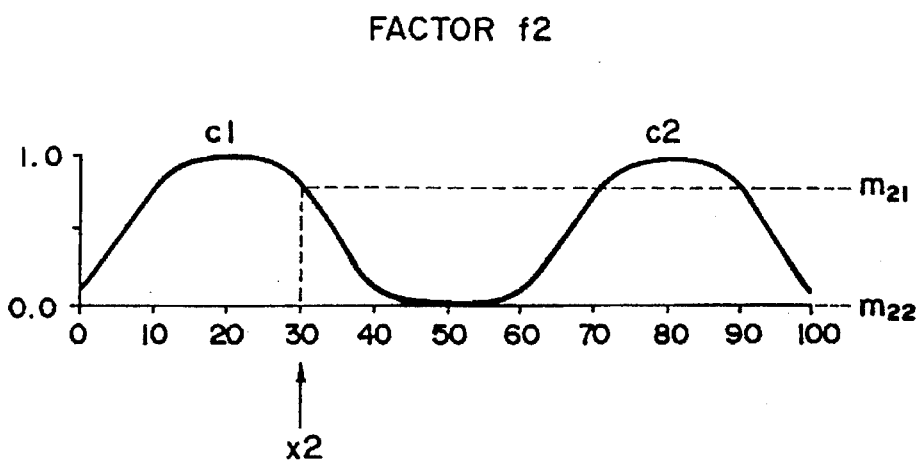

Degrees of membership $m_{11}$, $m_{12}$, $m_{21}$, $m_{22}$ are decided as follows, as shown in FIGS. 5a and 5b:

$m_{11}$: degree of membership of input data $x_1$ in conclusion $c_1$ $m_{12}$: degree of membership of input data $x_1$ in conclusion $c_2$ $m_{21}$: degree of membership of input data $x_2$ in conclusion $c_1$ $m_{22}$: degree of membership of input data $x_2$ in conclusion $c_2$ These degrees of membership are calculated by the degree-of-membership computing unit 15 when the items of input data $x_1$, $x_2$ are applied thereto.

The concept of fuzzy entropy will now be considered.

Fuzzy entropy Ef1 when the input $x_1$ is applied is defined as follows:

$$Ef1 = -\frac{m_{11}}{m_{11}+m_{12}} \log\left(\frac{m_{11}}{m_{11}+m_{12}}\right) \tag{13}$$
$$-\frac{m_{12}}{m_{11}+m_{12}} \log\left(\frac{m_{12}}{m_{11}+m_{12}}\right)$$

Fuzzy entropy is a type of index of information identification capability. The greater the clarity with which a conclusion can be identified when the input data $x_1$ is applied, the smaller the value of fuzzy entropy. Conversely, the greater the degree of ambiguity involved in identifying a conclusion, the larger the value of fuzzy entropy becomes. In other words, the greater the difference between the degree of membership $m_{11}$ of the input data $x_1$ in the conclusion $c_1$ and the degree of membership $m_{12}$ of the input data $x_1$ in the conclusion $c_2$, the smaller the value of fuzzy entropy; the smaller the difference, the greater the value of fuzzy entropy.

Similarly, fuzzy entropy Ef2 when the input $x_2$ is applied is given by the following equation:

$$Ef2 = -\frac{m_{21}}{m_{21}+m_{22}} \log\left(\frac{m_{21}}{m_{21}+m_{22}}\right) \tag{14}$$
$$-\frac{m_{22}}{m_{21}+m_{22}} \log\left(\frac{m_{22}}{m_{21}+m_{22}}\right)$$

The range of possible values of fuzzy entropy Ef is as follows:

$0 \leq Ef \leq \log(n)$ n: number of conclusions in terms of factors

In this example, the number of conclusions in terms of factor 1 ($f_1$) is two ($c_1$, $c_2$), and therefore the maximum value of fuzzy entropy Ef is log(2).

Next, a dynamic information quantity $If_{1D}(x_1)$ which prevails when the input data $x_1$ is applied is obtained using fuzzy entropy Ef1. Here the dynamic information quantity $If_{1D}(x_1)$ is the identification capability of a factor for deciding a conclusion when reasoning is performed. The greater the difference between the degree of membership $m_{11}$ of the input data $x_1$ in the conclusion $c_1$ and the degree of membership $m_{12}$ of the input data $x_1$ in the conclusion $c_2$, the larger the value of the dynamic information quantity; the smaller the difference, the smaller the value of the dynamic information quantity.

The dynamic information quantity $If_{1D}(x_1)$ regarding the factor $f_1$ is defined as the result obtained by subtracting the fuzzy entropy Ef1, which prevails when the input data $x_1$ is applied, from the maximum fuzzy entropy.

$$If_{1D}(x_1) = \log(2) + \left\{\frac{m_{11}}{m_{11}+m_{12}} \log\left(\frac{m_{11}}{m_{11}+m_{12}}\right) + \right. \tag{15}$$
$$\left. \frac{m_{12}}{m_{11}+m_{12}} \log\left(\frac{m_{12}}{m_{11}+m_{12}}\right)\right\}$$

Similarly, the dynamic information quantity which prevails when the input data $x_2$ is applied is as follows, with regard to the factor $f_2$:

$$If_{2D}(x_2) = \log(2) + \left\{\frac{m_{21}}{m_{21}+m_{22}} \log\left(\frac{m_{21}}{m_{21}+m_{22}}\right) + \right. \tag{16}$$
$$\left. \frac{m_{22}}{m_{21}+m_{22}} \log\left(\frac{m_{22}}{m_{21}+m_{22}}\right)\right\}$$

The dynamic information quantity computing unit 16 calculates the dynamic information quantity for every factor, in accordance with Eqs. (15) and (16), using the degrees of membership obtained by the degree-of-membership calculating unit 15.

The dynamic information quantity depends upon the input data $x_1$, $x_2$, as mentioned above. On the other hand, a static information quantity is independent of the input data. The result obtained by subtracting the average of fuzzy entropies within the range of a factor from the maximum fuzzy entropy shall be the static information quantity of the entire factor. For example, the static information quantity with regard to factor 1 is given by the following equation:

$$1f_{1S} = \log(2) + \left[ \sum_{x=1}^{100} \left\{ \frac{m_{11}(x)}{m_{11}(x)+m_{12}(x)} \log\left(\frac{m_{11}(x)}{m_{11}(x)+m_{12}(x)}\right) + \frac{m_{12}(x)}{m_{11}(x)+m_{12}(x)} \log\left(\frac{m_{12}(x)}{m_{11}(x)+m_{12}(x)}\right) \right\} \right] / 100 \quad (17)$$

Similarly, the static information quantity with regard to factor 2 is given by the following equation:

$$1f_{2S} = \log(2) + \left[ \sum_{x=1}^{100} \left\{ \frac{m_{21}(x)}{m_{21}(x)+m_{22}(x)} \log\left(\frac{m_{21}(x)}{m_{21}(x)+m_{22}(x)}\right) + \frac{m_{22}(x)}{m_{21}(x)+m_{22}(x)} \log\left(\frac{m_{22}(x)}{m_{21}(x)+m_{22}(x)}\right) \right\} \right] / 100 \quad (18)$$

where $m_{11}(x)$: degree of membership of input data x in conclusion $c_1$ with regard to factor $f_1$ $m_{12}(x)$: degree of membership of input data x in conclusion $c_2$ with regard to factor $f_1$ $m_{21}(x)$: degree of membership of input data x in conclusion $c_1$ with regard to factor $f_2$ $m_{22}(x)$: degree of membership of input data x in conclusion $c_2$ with regard to factor f2

$$\left[ \sum_{x=1}^{100} \ldots \right] /100:$$

calculation for varying x at an interval δ in the range 0–100 of the factor, computing fuzzy entropy for each x, and obtaining the average of these entropies (where $0 < \delta \leq 100$)

As will be understood from Eqs. (17) and (18), the greater the overlapping between membership functions of factors, the smaller the static information quantities of factors. Conversely, the smaller the overlapping between membership functions of factors, the greater the static information quantities of factors. In other words, the static information quantity indicates the capability of a membership function of a factor to identify a conclusion.

The static information quantity computing unit 19 computes and stores a static information quantity for every factor, in accordance with Eqs. (17) and (18), from membership functions obtained by combined knowledge. The static information quantity is independent of input data and therefore need be computed only once.

(8) Possibility computing unit 17

For each and every conclusion, an information quantity of a factor is calculated such that the sum total of information quantities of factors participating in the conclusion becomes 1 and the relative strengths of the information quantities of these factors do not change. This calculated information quantity is referred to as weight.

For example, when the above-described dynamic information quantities are used, each weight is as follows:

Weight of factor 1 with respect to conclusion 1:

$$wf_{11} = lf_{1D}(x_1)/[lf_{1D}(x_1)+lf_{2D}(x_2)] \quad (19)$$

Weight of factor 2 with respect to conclusion 1:

$$wf_{12} = lf_{2D}(x_2)/[lf_{1D}(x_1)+lf_{2D}(x_2)] \quad (20)$$

Weight of factor 1 with respect to conclusion 2:

$$wf_{21} = lf_{1D}(x_1)/[lf_{1D}(x_1)+lf_{2D}(x_2)] \quad (21)$$

Weight of factor 2 with respect to conclusion 2:

$$wf_{22} = lf_{2D}(x_2)/[lf_{1D}(x_1)+lf_{2D}(x_2)] \quad (22)$$

Next, the products of these weight and degrees of memberships are computed, these are totaled for every conclusion, and the result is outputted as the possibility of a conclusion.

For instance, in the above example, we have the following:

Possibility of conclusion 1: $wf_{11} \times m_{11} + wf_{12} \times m_{21}$ (23)

Possibility of conclusion 2: $wf_{21} \times m_{12} + wf_{22} \times m_{22}$ (24)

The possibility computing unit 17 performs the foregoing computations and calculates the possibility of every conclusion.

(9) Threshold-value input unit

The threshold-value input unit 31 is for allowing a human operator to directly input a threshold value with regard to a value representing the possibility of each conclusion. It is preferred that the input unit 31 have a display device for displaying instructive messages in order to facilitate the input of threshold values. The input operation is as follows: First, from of list of conclusions displayed on the screen of the display device, the operator designates, by using a mouse or the like, a conclusion whose threshold value is to be changed. Next, the threshold value regarding the designated conclusion is entered by a volume switch, mouse, etc. Since the operator can thus enter the threshold value of a conclusion directly whenever required, an improvement in the accuracy of the final results of reasoning can be expected.

The entered threshold value is stored in the threshold-value memory unit 32 by being applied to it directly or through a communication interface, memory or file.

(10) Threshold-value memory unit

The threshold-value memory unit 32 is adapted to store, in a memory or file and for every conclusion, the threshold values entered for respective ones of the conclusions, as illustrated in Table 4 below:

TABLE 4

| CONCLUSION | THRESHOLD VALUE |
| --- | --- |
| $c_1$ | 0.5 |
| $c_2$ | 0.7 |
| $c_3$ | 0.8 |

The "possibility of a conclusion" in fault diagnosis refers to the possibility that a fault which the conclusion represents has occurred. For example, conclusions $c_1$, $c_2$, $c_3$ may represent motor malfunction, breakage of a blade edge and cessation of shaft rotation, respectively. In the description that follows, it is assumed that possibility threshold values have been stored in the manner shown in Table 4.

(11) Possibility display unit

Possibility threshold values stored for the respective conclusions enter the possibility display unit 18 from the threshold-value memory unit 32, and the values of possibilities of respective conclusions calculated by the possibility computing unit 17 also enter the possibility display unit 18. Here the values of the possibilities and the corresponding threshold values are compared for every conclusion, and each conclusion whose possibility value is equal to or greater than the corresponding threshold value is displayed to inform the human operator. If necessary, possibility can be transmitted by communication or stored in a memory or file.

Thus, whether or not a conclusion holds true is not judged using identical criteria for all conclusions. Rather, each conclusion can be judged based upon a standard suited to the special characteristics of each conclusion using the threshold values set for respective ones of the conclusions.

For instance, in the example shown in Table 4, assume that possibility values have been calculated as illustrated in Table 5 below. In such case, only conclusion $c_1$ will be displayed because only the possibility of conclusion $c_1$ is greater than the threshold value corresponding thereto.

TABLE 5

| CONCLUSION | THRESHOLD VALUE | POSSIBILITY |
|---|---|---|
| $c_1$ | 0.5 | 0.6 |
| $c_2$ | 0.7 | 0.5 |
| $c_3$ | 0.8 | 0.5 |

Thus, in fault diagnosis, it is unnecessary for the human operator to constantly perform fault detection. Rather, constant, automatic monitoring is possible in which data enters from the machine undergoing fault diagnosis, fault diagnosing reasoning is performed by the approximate reasoning apparatus, and a warning is sent to the human operator or machine if the possibility of a conclusion (fault) exceeds the corresponding threshold value.

(12) Warning output unit

The input to the warning output unit 33 is the information from the possibility display unit 18. If the information input indicates the existence of a conclusion whose possibility value is equal to or greater than the corresponding threshold value, the warning output unit 33 issues a warning output to alarm the human operator as by a buzzer or lamp. If necessary, a fault-detection signal can be sent to a memory or file or to the machine by communication to halt the operation of the machine. By thus issuing an alarm, constant, automatic monitoring becomes possible in fault diagnosis (fault prediction). As a result, hazards can be avoided before they occur by stopping the machine when a fault is predicted to develop.

(13) Error-information input unit

When the human operator has judged that a conclusion displayed on the possibility display unit 18 (or a conclusion that is not displayed) is erroneous, the error-information input unit 34 allows the operator to input the erroneous conclusion. More specifically, the input unit 34 allows the operator to make the following inputs: a conclusion which, despite the fact that it actually holds true (i.e., despite the fact that there is a fault), is not displayed on the display unit 18 because the possibility of this conclusion is less than its threshold value, and a conclusion which, though the possibility thereof is equal to or greater than its threshold value and it therefore is displayed on the display unit 18 as holding true, actually does not hold true (i.e., there is no fault). These conclusions are the result of threshold values set erroneously. In order to change the threshold values regarding these erroneous conclusions, the inputted conclusion and the value of its possibility are sent, as error information, to the threshold-value altering unit 35 by communication or to a file or memory by being outputted thereto.

For instance, in the example of Table 5, the following error information would be applied to the threshold-value altering unit 35:

conclusion $c_1$: possibility 0.6 conclusion $c_2$: possibility 0.5 in case of the following:

conclusion $c_1$: threshold value 0.5: possibility 0.6: conclusion does not hold true in actuality (no fault has occurred);

conclusion $c_2$: threshold value 0.7: possibility 0.5: conclusion holds true in actuality (a fault has occurred);

conclusion $c_3$: threshold value 0.8: possibility 0.5: conclusion does not hold true in actuality (no fault has occurred).

(14) Threshold-value altering unit

The threshold-value altering unit 35 is for changing a threshold value regarding a conclusion contained in the error information based upon the error information provided by the error-information input unit 34. There are two cases in which a threshold value is changed. They are as follows:

1) A case where a possibility value is equal to or greater than the corresponding threshold value but the corresponding conclusion does not hold true in actuality; in this case, the threshold value is low and needs to be raised.

2) A case where a possibility value is less than the corresponding threshold value but the corresponding conclusion holds true in actuality; in this case, the threshold value is high and needs to be lowered.

A threshold value thus altered and the conclusion regarding this threshold value are stored in the threshold-value memory unit 32 by being applied thereto via communication, a memory or a file. That is, the threshold value that has been stored in the threshold-value memory unit 32 is revised. This revision of threshold value preferably is continued until the error information no longer occurs.

An example of an algorithm for threshold-value revision will now be described.

The threshold-value altering unit 35 alters a threshold value using a certain function $f(t,v)$ in a case where a certain conclusion and its possibility value are entered as error information. We have the following equation:

$$t' = f(t,v) \qquad (25)$$

where t: threshold value of conclusion t': threshold value of conclusion after alteration v: possibility value of conclusion The following may be considered as the function $f(t,v)$:

In case of item 1) above:

$$t' = \mathrm{MIN}(t + \Delta t, 1.0) \qquad (26)$$

where $\Delta t = 0.3 \ (0.5 \leq v - t \leq 1.0)$ $0.1 \ (0.3 \leq v - t < 0.5)$ $0.05 \ (0.1 \leq v - t < 0.3)$ $0.01 \ (0 < v - t < 0.1)$ and MIN represents an operation for selecting the smaller.

In case of item 2) above:

$$t'=\text{MIN}(t-\Delta t, 0) \quad (27)$$

where $\Delta t$ is the same as set forth above and MAX represents an operation for selecting the larger.

When the operations of Eqs. (26) and (27) are applied to conclusions $c_1$ and $c_2$, respectively, we have the following:

conclusion $c_1$:

$$t'=0.5+0.05=0.55 \quad (28)$$

conclusion $c_2$:

$$t'=0.7-0.05=0.65 \quad (29)$$

It goes without saying that threshold-value altering algorithm is not limited to that of the example described above.

In case of fault diagnosis, there are instances where a conclusion (fault) occurs even though the corresponding possibility value is not large enough. According to the present invention, a threshold value conforming to the circumstances under which each conclusion (fault) occurs can be set and changed, and this makes possible fault diagnosis suited to the special characteristics of the machine undergoing diagnosis.

(15) Clarity computing unit

The clarity computing unit 20 computes the clarity of each factor for each and every conclusion. Here the clarity of each factor for each and every conclusion is taken to be an indication of the relative identification capability of each factor when a certain conclusion is decided. Accordingly, the identification capabilities of a plurality of factors for deciding a certain conclusion can be compared depending upon clarity so that which factor possesses a high identification capability (i.e., which factor possesses a large quantity of information) can be understood. A method of calculating clarity will now be described.

First, the relationship among conclusions, factors and static information quantities is shown in Table 6.

TABLE 6

| FACTOR | CONCLUSION | |
|---|---|---|
| | $c_1$ | $c_2$ |
| $f_1$ | $If_{1S}$ | $If_{1S}$ |
| $f_2$ | $If_{2S}$ | $If_{2S}$ |
| TOTAL | $If_{1S} + If_{2S}$ | $If_{1S} + If_{2S}$ |

As will be understood from Table 6, the identification capabilities of a plurality of factors for deciding each conclusion can be compared depending upon static information quantities as well. However, since relative identification capability is difficult to grasp intuitively in this form, the static information quantity is normalized for each and every conclusion, as shown in the following table, and the normalized value is adapted as clarity Cl of each factor for each and every conclusion.

TABLE 7

| FACTOR | CONCLUSION | |
|---|---|---|
| | $c_1$ | $c_2$ |
| $f_1$ | $Cl_{11}$ | $Cl_{12}$ |
| $f_2$ | $Cl_{21}$ | $Cl_{22}$ |
| TOTAL | 1 | 1 |

In Table 7, we have $Cl_{11}=Cl_{12}=If_{1S}/(If_{1S}+If_{2S})$ $Cl_{21}=Cl_{22}=If_{2S}/(If_{1S}+If_{2S})$ Thus, in the clarity computing unit 20, the clarity of each factor is calculated for each and every conclusion.

(16) Clarity memory unit

The clarity memory unit 21 stores the clarity of each factor for every conclusion calculated by the clarity computing unit 20. The computation of clarity need not be performed each time reasoning is carried out. Accordingly, the clarity calculated is stored in the clarity memory unit 21 in advance when knowledge is combined, and a value that has been stored in the clarity memory unit 21 is read out whenever reasoning is executed. This makes it possible to achieve high-speed reasoning processing.

(17) Clarity adding unit

The clarity adding unit 22 calculates the clarity of a factor for which data has actually been inputted. Here, for the sake of reasoning actually carried out, the sum total of clarities of factors for which data has been inputted is calculated. The slum total of clarities indicates the clarity of the result of reasoning. It can be said that the greater the clarity, the greater the information quantity for deriving the result of reasoning. Accordingly, clarity can be used as an index for judging the reliability of the result of reasoning itself.

Clarity regarding the result of reasoning is calculated as follows:

a) In a case where data is inputted with regard to only factor 1 ($f_1$)
  ♦ clarity regarding results of reasoning of of conclusion 1 ($c_1$): $Cl_1=Cl_{11}$
  ♦ clarity regarding results of reasoning of of conclusion 2 ($c_2$): $Cl_2=Cl_{12}$ b) In a case where data is inputted with regard to only factor 2 ($f_2$)
  ♦ clarity regarding results of reasoning of of conclusion 1 ($c_1$): $Cl_1=Cl_{21}$
  ♦ clarity regarding results of reasoning of of conclusion 2 ($c_2$): $Cl_2=Cl_{22}$ c) In a case where data is inputted with regard to both factor 1 ($f_1$) and factor 2 ($f_2$)
  ♦ clarity regarding results of reasoning of of conclusion 1 ($c_1$): $Cl_1=Cl_{11}+Cl_{21}=1.0$
  ♦ clarity regarding results of reasoning of of conclusion 2 ($c_2$): $Cl_2=Cl_{12}+Cl_{22}=1.0$ Thus the range of possible values of clarity Cl of results of reasoning is $$0.0 \leq Cl \leq 1.0$$

In other words, in a case where reasoning is performed upon entering data regarding all factors capable of being used to deduce a certain conclusion in a body of knowledge given before reasoning is carried out, the clarity of the conclusion will be 1.0. In a case where data is inputted with regard to only some factors among the factors capable of being used to deduce a certain conclusion, clarity takes on a value between 0.0 and 1.0. If many factors having a high degree of clarity among the usable factors are employed in such case, the clarity of the conclusion also will be high and the results of reasoning will have a high reliability.

(18) Clarity display unit

The clarity display unit 23 displays the clarity of the results of reasoning (one example of which is possibility, described above) calculated by the clarity adding unit 22. Clarity can be displayed along with the results of reasoning. Alternatively, clarity can be transmitted to another apparatus or stored in a memory or file.

The display of clarity is presented with regard to all conclusions of the results of reasoning. Accordingly, in a case where a plurality of conclusions exists, the clarity corresponding to each conclusion is displayed.

Thus, whenever data is inputted, the information quantity of a factor to which the inputted data belongs is calculated and the clarity regarding the results of reasoning is displayed, thereby making it possible for the user to judge the reliability of the results of reasoning.

It goes without saying that the units 11–23 and 31–35 described above can be realized by a computer which includes a memory and a display unit. For example, the knowledge synthesizing unit 12 and the various computing units 15, 16, 17, 19, 20, 22 and 35 are realized ideally by a CPU which operates in accordance with a program.

Figure 6:
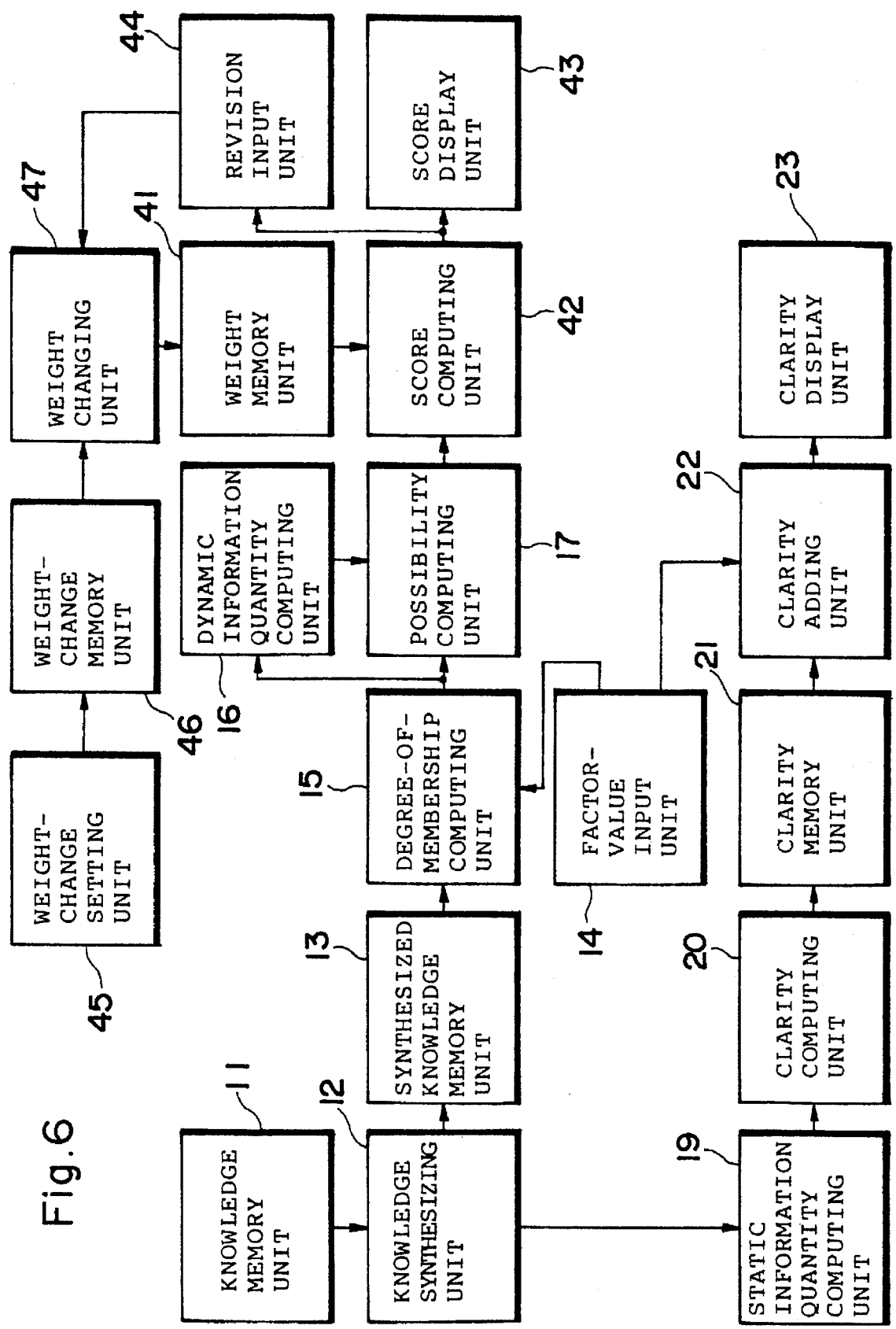
FIG. 6 is a block diagram illustrating an example of the overall construction of an approximate reasoning apparatus and interface apparatus according to a second embodiment of the present invention.

II. SECOND EMBODIMENT (1) Overall construction of approximate reasoning apparatus and interface apparatus FIG. 6 is a block diagram illustrating an example of the overall construction of an approximate reasoning apparatus and interface apparatus according to the second embodiment of the present invention. The approximate reasoning apparatus comprises the knowledge memory unit 11, the knowledge synthesizing unit 12, the synthesized knowledge memory unit 13, the factor-value input unit 14, the degree-of-membership computing unit 15, the dynamic information quantity computing unit 16, the possibility computing unit 17, the static information quantity computing unit 19, the clarity computing unit 20, the clarity memory unit 21, the clarity adding unit 22, and the clarity display unit 23.

The interface apparatus, which is for interfacing the approximate reasoning apparatus with a human being (an operator, attendant or the like) includes a weight memory unit 41, a score computing unit 42, a score display unit 43, a revision input unit 44, a setting unit 45 for setting an amount of change in weight, memory unit 45 for storing the amount of change in weight, and a weight changing unit 47.

These units will now be described in detail taking fault diagnosis as an example.

The knowledge memory unit 11, the knowledge synthesizig unit 12, the synthesized knowledge memory wit 13, the factor-value input unit 14, the degree-of-membership computing unit 15, the dynamic information quantity computing unit 16, the possbility computing unit 17, the static information quantity computing unit 19, the clarity computing unit 20, the clarity memory unit 21, the clarity adding unit 22, and the clarity display unit 23 are identical with those in the first embodiment and a description thereof is omitted in order to avoid prolixity.

(2) Weight memory unit

The weight memory unit 41 is for storing, in a memory, file or the like, and in the form of Table 8 below, the weight set for each conclusion. In addition, the weight memory unit 41 accepts and stores weights changed by the weight changing unit 47. It will be assumed here that the initial value of the weight of each conclusion is 1.0. It is permissible also for the weights of conclusions to be designated by a human being.

TABLE 8

| CONCLUSION | WEIGHT (W) |
|---|---|
| $c_1$ | 1.0 |
| $c_2$ | 1.0 |
| $c_3$ | 1.0 |

(3) Score computing unit

The score computing unit 42 obtains the validity score of each conclusion (namely a score which gives an indication as to whether or not the conclusion holds true) by applying the arithmetic operation represented, for example, by the following equation, to the possibility value of each conclusion calculated by the possibility computing unit 17 and the weight of each conclusion stored in the weight memory unit 41:

$$P_i = V_i \times W_i \qquad (30)$$

where $P_i$ represents the score (i=1, 2, 3, . . . ) of conclusion $c_i$;

$V_i$ represents the possibility [see Eqs. (23), (24) of conclusion $c_i$; and $W_i$ represents the weight (see Table 8) of conclusion $c_i$.

By virtue of this arithmetic operation, scores of the kind shown in Table 9 below are obtained for respective ones of the conclusions.

TABLE 9

| CONCLUSION ($c_i$) | POSSIBILITY ($V_i$) | WEIGHT ($W_i$) | SCORE ($P_i$) |
|---|---|---|---|
| $c_1$ | 0.8 | 1.0 | 0.8 |
| $c_2$ | 0.7 | 1.1 | 0.77 |
| $c_3$ | 0.6 | 1.0 | 0.6 |

(4) Score display unit

The score display unit 43 displays, for each and every conclusion, the score calculated by the score computing unit 42, thereby informing an individual of the score. An arrangement can be adopted in which the unit 43 transmits the score by communication or stores the score in a memory or file. In this embodiment, three conclusions whose scores are the highest ranking are displayed. It is permissible to adopt an arrangement in which the number of conclusions displayed is one or a plurality other than three.

(5) Revision input unit

The revision input unit 44 is used in a case where the order of the score sizes of the three conclusions (faults) displayed on the score display unit 43 differs from the degree of priority (or the degree of significance of faults) with which repair of the faults is actually carried out. The revision input unit 44 allows the human operator to enter the correct order (the order believed to be correct by the operator). If the order of the score sizes and the degree of priority which the operator believes to be correct coincide, no input is necessary.

The degree of priority with which fault repair is actually performed is decided upon considering the man-hours and cost for the repairs, the reliability of the machine and associated parts, etc. For example, priority can be given to making man-hours as few as possible.

Conventionally, only the possibilities of conclusions are displayed, and the human operator decides the order of fault repairs upon taking the degree or priority into account. According to the present invention, the human operator can enter degree of priority in advance, thereby making it possible to automate the apparatus even in regard to making judgments which take degree of priority into account. Further, since an individual enters degree of priority, it is possible to obtain results suited to the special characteristics of the machine prevailing at that time. As a result, it is possible to cope with changes in the machine with time.

(6) Unit for setting amount of change in weight

The setting unit 45 is for setting (entering), in the form of Table 10 below, an amount (percentage) of change in weight used in a weight change performed by the weight changing unit 47. In this embodiment, amount of change is decided regarding an increase and decrease in dependence upon the magnitude of the conclusion possibility value. The amount of change in weight can be set and altered by an individual at any time.

TABLE 10

| CONCLUSION POSSIBILITY LIMITS | AMOUNT OF CHANGE: INCREASE | AMOUNT OF CHANGE: DECREASE |
| --- | --- | --- |
| 0.0–0.5 | 1.2 | 0.95 |
| 0.5–0.8 | 1.1 | 0.9 |
| 0.8–1.0 | 1.05 | 0.8 |

(7) Memory unit for storing amount of change in weight

The memory unit 46 stores, in the form of Table 10 above, the mount of change in weight set by the setting unit 45. The mount of change stored in unit 46 is referred to when a weight is to be changed using the weight changing unit 47.

(8) Weight changing unit

The weight changing unit 47 is for correcting and changing the weight of a conclusion in accordance with the correct order (degree of priority), revised by the human operator, obtained from the revision input unit 44.

For example, it will be assumed here that the order (revised order, degree of priority) inputted by the operator is the order $c_2$, $c_1$, $c_3$, as shown in Table 11 below. Since the sizes of the scores are in the order $c_1$, $c_2$, $c_3$, a weight change is required.

TABLE 11

| CONCLUSION ($c_i$) | POSSIBILITY ($V_i$) | WEIGHT ($W_i$) | SCORE ($P_i$) | REVISED ORDER (DEGREE OF PRIORITY) |
| --- | --- | --- | --- | --- |
| $c_1$ | 0.8 | 1.0 | 0.8 | 2 |
| $c_2$ | 0.7 | 1.1 | 0.77 | 1 |
| $c_3$ | 0.6 | 1.0 | 0.6 | 3 |

A change in weight can be carried out in accordance with the following algorithm:

1) When the revised item in the revised order is No. 1

The change is made so as to increase the weight of the conclusion. Among the amounts of change in the increasing direction stored in the memory unit 46, reference is made to the amount of change in the increasing direction pertinent to the possibility value of the conclusion. In this example, the possibility of conclusion $c_2$ is 0.7, and therefore the amount of change in weight from Table 10 is 1.1. Accordingly, the product of the current weight 1.1 and the amount of change 1.1 is adopted as the new weight, namely $WO_i$. Thus, $$c_2: WO_2 = 1.1 \times 1.1 = 1.21 \tag{31}$$

2) When the revised item in the revised order is No. 2
The weight of the conclusion is not changed. Thus, $$c_1: WO_1 = 1.0 \tag{32}$$

3) When the revised item in the revised order is No. 3

The change is made so as to decrease the weight of the conclusion. Among the amounts of change in the decreasing direction stored in the memory unit 46, reference is made to the amount of change in the decreasing direction pertinent to the possibility value of the conclusion. In this example, the possibility of conclusion $c_3$ is 0.6, and therefore the amount of change in weight from Table 10 is 0.9. Accordingly, the product of the current weight 1.0 and the amount of change 0.9 is adopted as the new weight $WO_i$. Thus, $$c_3: WO_3 = 1.0 \times 0.9 = 0.9 \tag{33}$$

The new weight $WO_i$ thus calculated and changed is stored in the weight memory unit 41 directly or through a communication interface, memory or file.

In the case of above example, the new weights and scores are as shown in Table 12 below. The order of the new score sizes agrees with the degree of priority (the revised order) entered by the human operator.

TABLE 12

| CONCLUSION ($c_i$) | POSSIBILITY ($V_i$) | NEW WEIGHT ($WO_i$) | NEW SCORE ($PO_i$) |
| --- | --- | --- | --- |
| $c_1$ | 0.8 | 1.0 | 0.8 |
| $c_2$ | 0.7 | 1.21 | 0.847 |
| $c_3$ | 0.6 | 0.9 | 0.54 |

If the sizes of scores do not agree with the degree of priority inputted by a human operator, it will suffice to repeat the above-described algorithm.

It goes without saying that the algorithm for changing conclusion weights is not limited to the foregoing example, and a variety of approaches can be used.

Thus, by adopting the arrangement described above, results of reasoning which take the special characteristics of a particular machine into account, and which are made to conform to human thought, can be obtained without revising the knowledge base itself.

In the foregoing embodiment, the weights of conclusions are changed by a human operator inputting a sequence designation if the sequence of the sizes of displayed scores differs from the order of priority conceived of by a human being. However, an arrangement is feasible in which the human operator directly changes a weight itself. In such case, it would suffice to provide a weight input unit contrived to make the input operation easy. This would make it possible for a human operator to perform the weight revision whenever appropriate. Then, when it is believed that a fault in a machine will no longer be likely to occur because of repairs, for example, an attendant or operator would be able to reduce the weight of this particular fault. Thus, the results of reasoning can be made to conform to the characteristics of the machine.

It goes without saying that the units 11–23 and 41–47 described above can be realized by a computer which includes a memory and a display unit. For example, the knowledge synthesizing unit 12 and the various computing units 15, 16, 17, 19, 20, 22, 42 and 47 are realized ideally by a CPU which operates in accordance with a program.

II. THIRD EMBODIMENT

Figure 7:
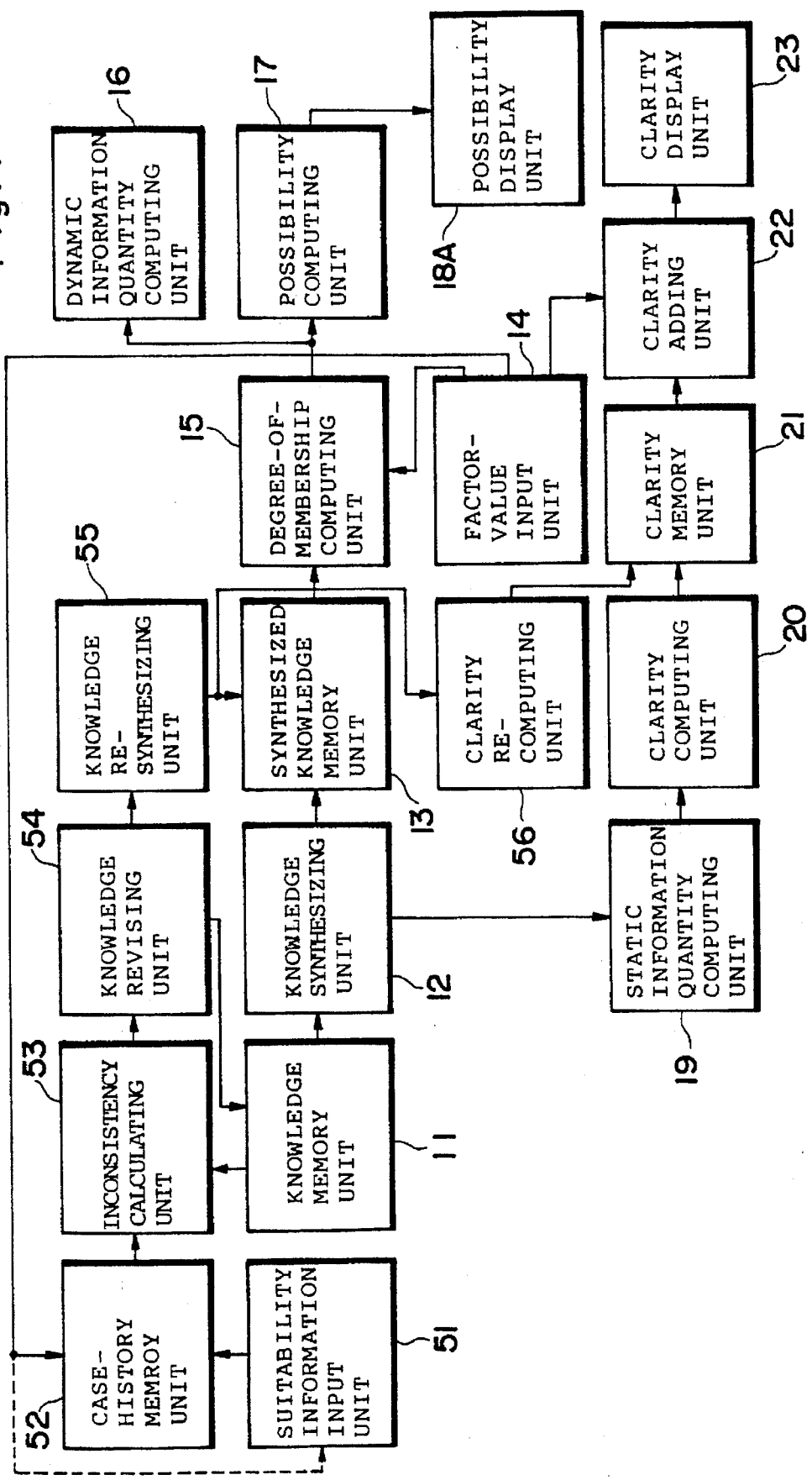
FIG. 7 is a block diagram illustrating an example of the overall construction of an approximate reasoning apparatus and automatic knowledge revising apparatus according to a third embodiment of the present invention.

FIG. 7 is a block diagram illustrating an example of the overall construction of an approximate reasoning apparatus and automatic knowledge revising means according to the third embodiment of the present invention. The approximate reasoning apparatus comprises the knowledge memory unit 11, the knowledge synthesizing unit 12, the synthesized knowledge memory unit 13, the factor-value input unit 14, the degree-of-membership computing unit 15, the dynamic information quantity computing unit 16, the possibility computing unit 17, a possibility display unit 18A, the static information quantity computing unit 19, the clarity computing unit 20, the clarity memory unit 21, the clarity adding unit 22, and the clarity display unit 23.

The automatic knowledge revising apparatus includes a suitability information input unit 51, a case-history memory unit 52, an inconsistency calculating unit 53, a knowledge revising unit 54, a knowledge re-synthesizing unit 55 and a clarity re-computing unit 56.

These units will now be described in detail taking fault diagnosis as an example.

The knowledge memory unit 11, the knowledge synthesizing unit 12, the synthesized knowledge memory unit 13, the factor-value input unit 14, the degree-of-membership computing unit 15, the dynamic information quantity computing unit 16, the possibility computing unit 17, the static information quantity computing unit 19, the clarity computing unit 20, the clarity memory unit 21, the clarity adding unit 22, and the clarity display unit 23 are identical with those in the first embodiment and a description thereof is omitted in order to avoid prolixity.

(2) Possibility display unit

The possibility display unit 18A displays, for every conclusion, the possibility computed by the possibility computing unit 17. The display of possibility can be presented for all conclusions, or one or a plurality of possibilities can be displayed for a conclusion or conclusions for which the possibility is high. For example, it can be arranged to display a conclusion whose possibility is equal to or greater than a prescribed threshold value (e.g., 50%). In addition, possibilities can be transmitted to another apparatus by communication or stored in a memory or file.

(3) Suitability information input unit

The suitability information input unit 51 is for allowing mainly a human operator to enter a correct conclusion with regard to the possibility of a conclusion displayed on the possibility display unit 18A, or in relation to a conclusion not displayed on the display unit 18. For example, when the possibilities of faults have been displayed on the display unit 18A (e.g., when conclusions whose possibilities is equal to or greater than 50% have been displayed) in a fault-diagnosis field of application, the operator designates an actually occurring fault from among the displayed faults or designates an actually occurring fault even if it is not being displayed. In addition, data regarding factors associated with the designated fault (conclusion) is entered. Since which portion of the machine is faulty can be determined from information supplied by sensors attached to the machine, automatic entry of information relating to the fault and information relating to the factor-value data is possible.

The suitability information input unit 51 creates case-history data of the kind shown in Table 13 below when a conclusion and factor-value data associated therewith have been entered.

TABLE 13

| CONCLUSION $c_i$ | | | |
|---|---|---|---|
| ASSOCIATED FACTOR | .... | $f_j$ | .... |
| FACTOR VALUE | .... | $x_j$ | .... |

In Table 13, we have:

$c_i$: designated correct conclusion (fault)

$f_j$: factor associated with $c_i$ $x_j$: factor-value data of factor $f_j$

Figure 8:
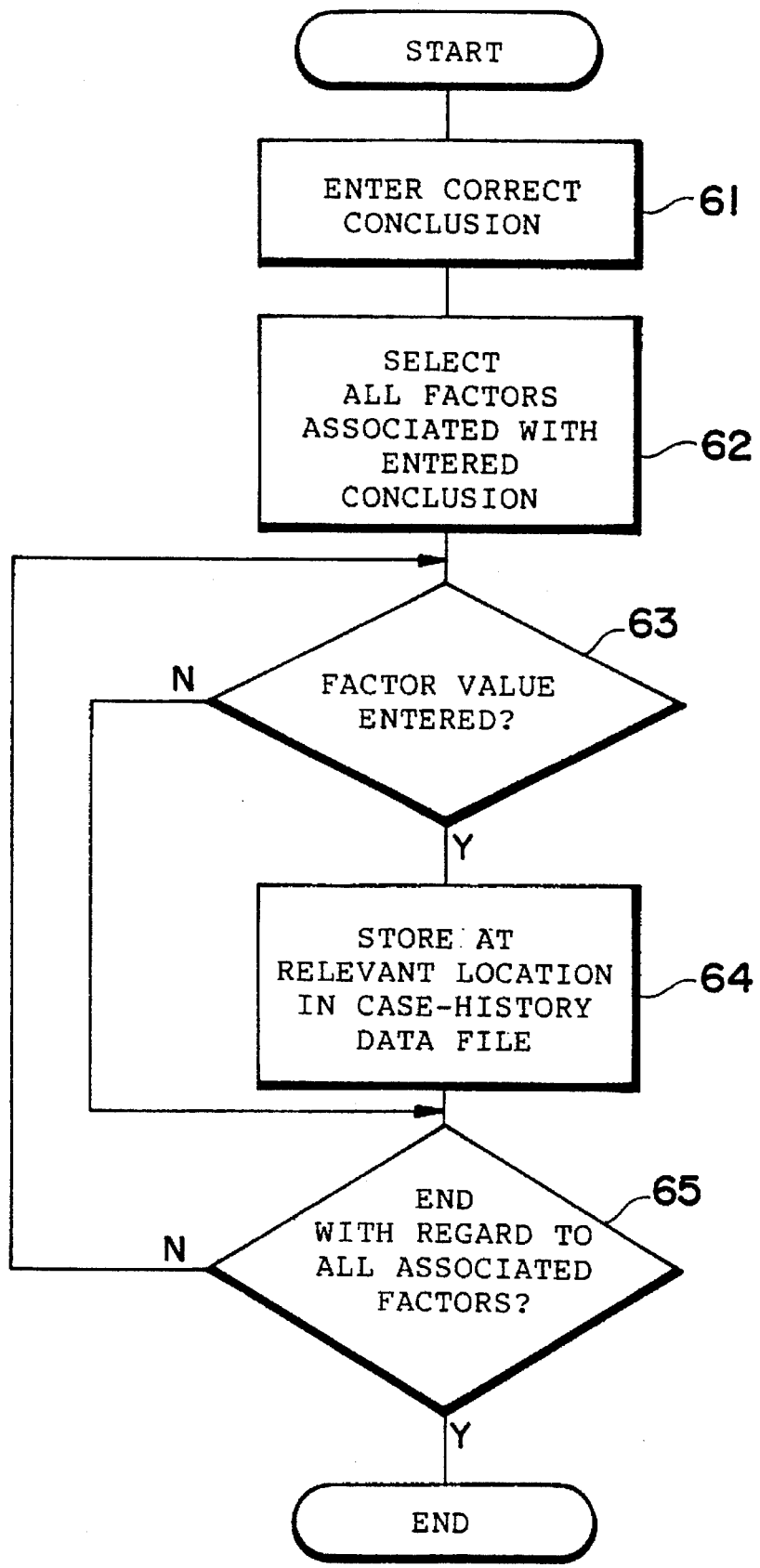
FIG. 8 is a flowchart illustrating a processing procedure for creating case-history data.

FIG. 8 illustrates a processing procedure for creating the case-history data in the suitability information input unit 51. When a correct conclusion fault) is inputted from a keyboard or the like at step 61 in the flowchart of FIG. 8, all factors associated with this conclusion are selected at step 62. Factors associated with a conclusion are known from stored knowledge or computed results in the knowledge memory unit 11, knowledge synthesizing unit 12, synthesized knowledge memory unit 13 or possibility computing unit 17. When factor-value data regarding all factors associated with an inputted conclusion have been entered from the factor-value input unit 14 (or from a keyboard or sensor, etc.), the data is stored in a case-history data file, of the kind shown in Table 13, in association with the corresponding conclusion. The foregoing processing is shown at step 63, 64 and 65 in FIG. 8.

By way of example, assume that the possibility display unit 18A displays the following fault possibilities:

fault $c_1$: possibility 0.8 fault $c_2$: possibility 0.6

If fault $c_1$ has actually occurred, then the human operator enters fault $c_1$. When this is done, the input unit 51 judges that the factors associated with conclusion $c_1$ are $f_1$ and $f_2$. If 35 is entered as the factor value of $f_1$ and 5 as the factor value of $f_2$, then case-history data of the kind illustrated in Table 14 below is created.

TABLE 14

| CONCLUSION $c_i$ | | |
|---|---|---|
| ASSOCIATED FACTOR | $f_1$ | $f_2$ |
| FACTOR VALUE | 35 | 5 |

If a maintenance report or the like reporting faults and the mechanical symptoms (factor values) produced by the faults is available in a fault diagnosis application, the maintenance report need only be inputted directly to the input unit 51. When such a maintenance report is available, the suitability of a conclusion need not be inputted whenever fault diagnosis is executed; rather, suitability-information input processing can be executed in batches.

(4) Case-history memory unit

Figure 9:
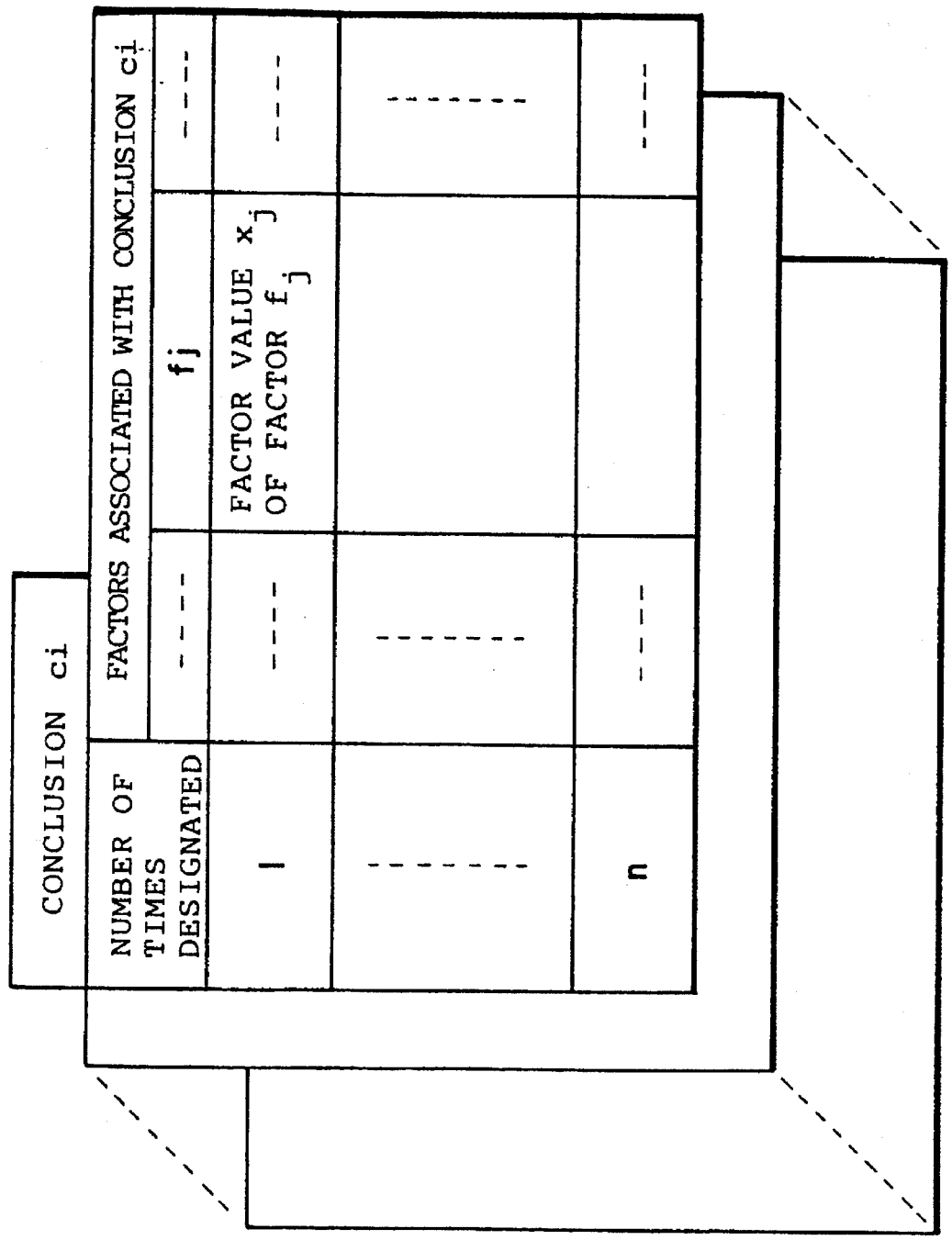
FIG. 9 shows an example of a case-history data file.

The case-history memory unit 52 is for cumulatively storing, in the form of a table (file) and for every conclusion, as shown in FIG. 9, the case-history data created by the suitability information input unit 51. It will suffice if newly created case-history data is stored in a form added to the end of a case-history data file that has already been stored. In FIG. 9, n represents the number of times $c_i$ has been designated as a correct conclusion. Factor-value data entered by the factor-value input unit 14 can be applied to either the input unit 51 or the memory unit 52. As will be described later, when knowledge revision is carried out by the knowledge revising unit 54, the case-history data regarding the conclusion for which the revision has been made is erased.

For example, assume that the case-history data shown in Table 14 regarding conclusion $c_1$ has been added by the third designation of $c_1$. In such case, the case-history file regarding conclusion $c_1$ within the case-history memory unit 52 becomes as shown in Table 15 below.

TABLE 15

| CONCLUSION $c_1$ NUMBER OF | ASSOCIATED FACTORS | |
| --- | --- | --- |
| TIMES | $f_1$ | $f_2$ |
| 1 | 40 | 20 |
| 2 | 45 | 35 |
| 3 | 35 | 5 |

(5) Inconsistency calculating unit

The inconsistency calculating unit 53 starts operating when a fixed amount of case history regarding each conclusion stored in the case-history memory unit 52 has been accumulated, or when one day of work has ended. Accordingly, processing can be performed in batches, and since processing for calculating degree of inconsistency can be performed when the load on the CPU is small, there is no need to increase the burden on the CPU during the time that the particular machine is operating.

The inconsistency calculating unit 53 calculates, with regard to respective ones of all factors $f_j$ associated with each conclusion $c_i$, the degree of inconsistency between the limits (range) of factor-value data stored in the case-history memory unit 52 and the knowledge, of each expert, regarding the same factors of the same conclusion stored in the knowledge memory unit 11. One example of an algorithm for calculating degree of inconsistency is illustrated in FIG. 10 in relation to factor $f_j$ of conclusion $c_i$.

Figure 10:
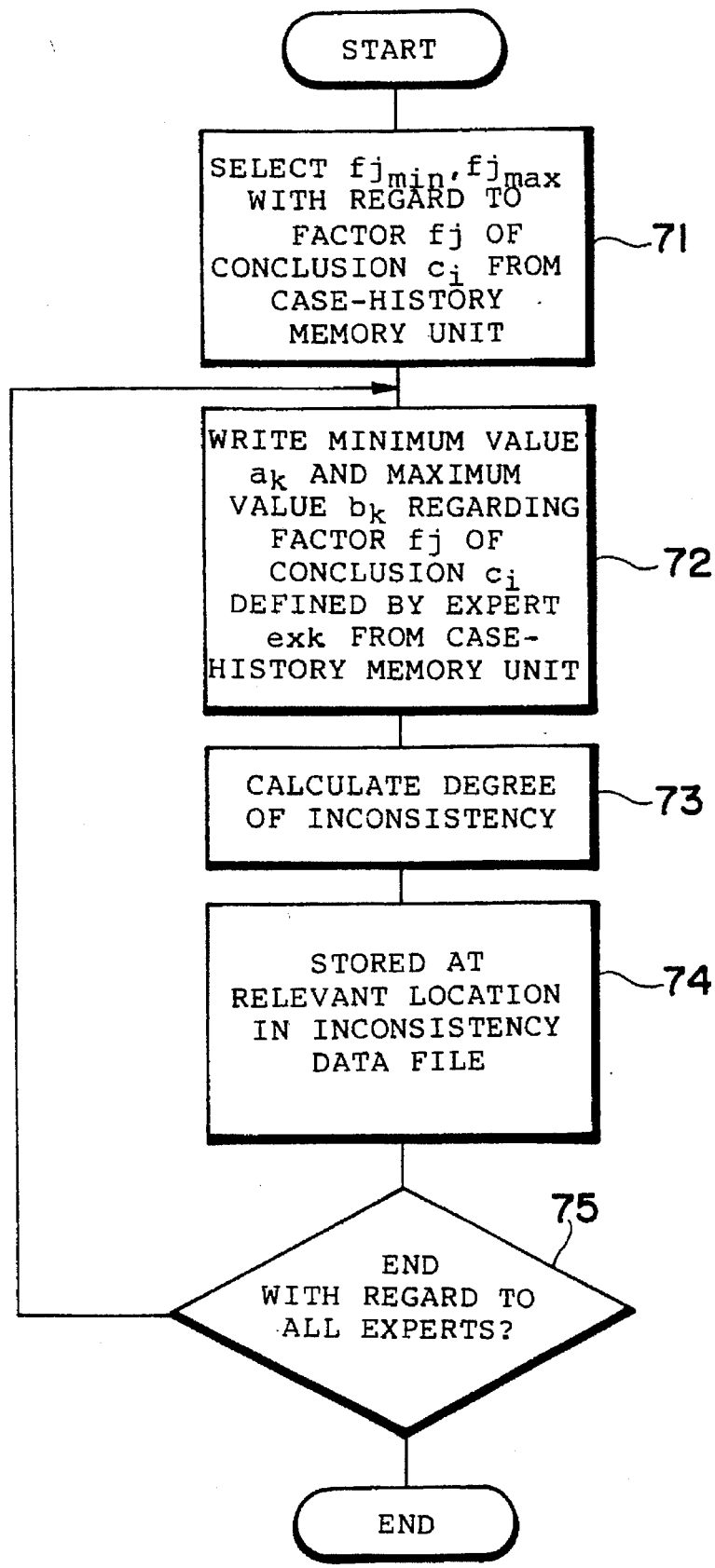
FIG. 10 is a flowchart illustrating a processing procedure for calculating degree on inconsistency.

First, at step 71 in the flowchart of FIG. 10, a minimum value $fj_{min}$ and a maximum value $fj_{max}$ of factor-value data relating to factor $f_j$ are selected from the case-history data file regarding $c_i$ stored in the case-history memory unit 52. Next, a minimum value $a_k$ and a maximum value $b_k$ of the knowledge of an expert exk relating to factor $f_j$ of the conclusion $c_i$ stored in the knowledge memory unit 11 are read out of this memory at step 72, and then degree of inconsistency is calculated at step 73 in accordance with the following equation using the data selected and the data read:

$$\text{degree of inconsistency} = |a_k - fj_{min}| + |b_k - fj_{max}| \quad (34)$$

The calculated degree of inconsistency is stored at the corresponding location of an inconsistency data file of the kind shown in FIG. 11 at step 74. This inconsistency data file has areas for storing degrees of inconsistency for all factors, on an expert-by-expert basis, with regard to the conclusion $c_i$.

When the above-mentioned processing has been executed with regard to all experts, processing for calculating degree of inconsistency regarding one factor $f_j$ associated with one conclusion $c_i$ ends at step 75.

Processing is executed in the same manner for all other factors associated with the conclusion $c_i$. In addition, such processing is executed for all conclusions or for the conclusions required.

Figure 12:
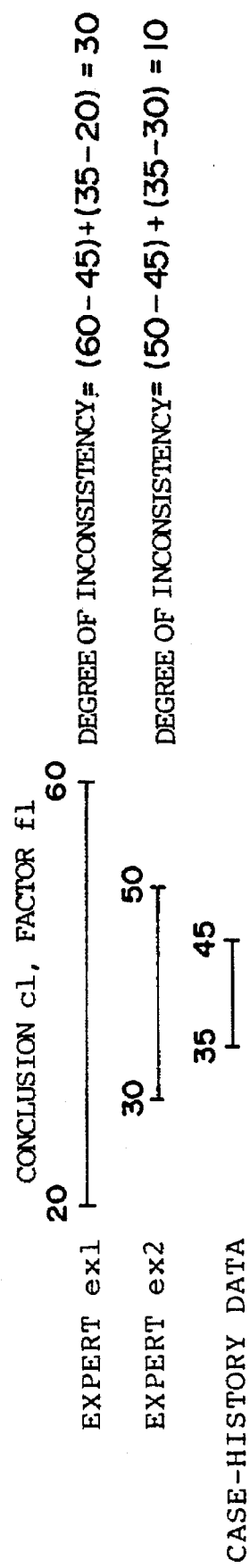
FIGS. 12 and 13 show examples of degrees of inconsistency.
Figure 13:
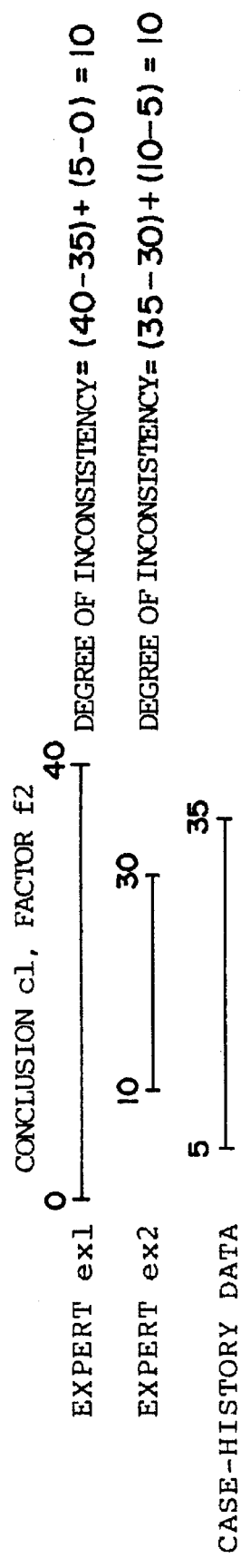

By way of example, degrees of inconsistency between knowledge data regarding factor $f_1$ associated with conclusion $c_1$ of experts $ex_1$, $ex_2$ indicated in Tables 1 and 2 and the case-history data indicated in Table 15 are 30 and 10, respectively, as illustrated in FIG. 12. Degrees of inconsistency between knowledge data regarding factor $f_2$ associated with conclusion $c_1$ of experts $ex_1$, $ex_2$ and the case-history data indicated in Table 15 are 10 and 10, respectively as shown in FIG. 13.

(6) Knowledge revising unit

The knowledge revising unit 54 revises, in accordance with the following algorithm and through use of the inconsistency data obtained as set forth above, the knowledge of a particular expert stored in the knowledge memory unit 11:

1) The limits (range) of a factor value in the knowledge of the expert exhibiting the greatest degree of inconsistency is revised, for each factor of a conclusion, to the limits of the minimum and maximum values of the case-history data.

2) However, if the degrees of inconsistency all fall within certain threshold values, no revision is carried out.

The threshold values are determined as follows, by way of example:

$$\text{threshold value} = (\text{possible range of each factor value}) \times 0.1 \quad (35)$$

If the possible range (domain of definition) of the factor value for factor $f_1$ or $f_2$ is 100, then the threshold value will be 10.

3) The knowledge of the particular expert in the storage unit 11 is updated by the revised knowledge.

By virtue of the foregoing operation, the knowledge of the expert believed to be not very correct can be revised automatically, namely without requiring judgments and revision by the human operator.

For example, the degrees of inconsistency of experts $ex_1$ and $ex_2$ shown in FIG. 12 are 30 and 10, respectively. Since the degree of inconsistency, namely 30, of expert $ex_1$ is the greatest and this degree of inconsistency exceeds the aforementioned threshold value of 10, the knowledge of expert $ex_1$ regarding factor $f_1$ associated with conclusion $c_1$ is revised to the minimum value 35 and maximum value 45 using the case-history data. Accordingly, Table 1 becomes as follows:

TABLE 16

| | EXPERT $ex_1$ | | | |
| --- | --- | --- | --- | --- |
| | CONCLUSION | | | |
| | $c_1$ | | $c_2$ | |
| FACTOR | MINIMUM VALUE | MAXIMUM VALUE | MINIMUM VALUE | MAXIMUM VALUE |
| f1 | 35 | 45 | 40 | 80 |
| f2 | 0 | 40 | 60 | 100 |

The degree of inconsistency shown in FIG. 13 is 10 for both of the experts $ex_1$, $ex_2$. Since this does not exceed the threshold value of 10, the knowledge regarding the factor $f_2$ of conclusion $c_1$ is not revised.

(7) Knowledge re-synthesizing unit

The knowledge re-synthesizing unit 55 is for re-synthesizing (recombining) knowledge solely with regard to portions associated with the revised knowledge. The synthesizing method is the same as that performed by the knowledge synthesizing unit 12. The results of re-synthesis are applied to and stored in the synthesized knowledge memory unit 13. In the foregoing example, what is revised relates solely to factor $f_1$ of conclusion $c_1$, and therefore all that need to be recalculated are the mean and standard deviation of the minimum values as well as the mean and standard deviation of the maximum values of this factor of the conclusion.

Since only the relevant portions are re-synthesized and not the entire body of knowledge, it is possible to raise processing speed. It goes without saying that after re-synthesis of the relevant portions of the knowledge, approximate reasoning is performed using the new knowledge resulting from this re-synthesis.

(8) Clarity re-computing unit

The clarity re-computing unit 56 executes re-computation of clarity solely with regard to portion associated with the revised knowledge. The method of computing clarity is the same as that performed by the clarity computing unit 20. In the foregoing example, what is revised relates solely to factor $f_1$ of conclusion $c_1$. Therefore, a static information quantity is obtained with regard to the factor $f_1$ of conclusion $c_1$, and clarity is calculated from this static information quantity.

Processing for this calculation also is executed in batches (e.g., during rest periods or at night), as a result of which there is no increase in the load on the CPU during machine operation.

In the foregoing embodiment, expert knowledge stored in the knowledge memory unit is revised based upon information possessed by the case-history data. However, it is permissible to adopt an arrangement in which the mean values and standard deviations stored in the synthesized knowledge memory unit are revised directly.

In a situation where there are a plurality of the same approximate reasoning apparatus, even though the same (standard) knowledge is entered in all of the apparatus initially, knowledge is revised automatically. This makes possible fault diagnosis conforming to the special characteristics, which may change with the passage of time, of each machine undergoing diagnosis.

It goes without saying that the units 11–23 and 51–56 described above can be realized by a computer which includes a memory and a display unit. For example, the knowledge synthesizing unit 12 and the various computing units 15, 16, 17, 19, 20, 22, 53, 55 and 56 are realized ideally by a CPU which operates in accordance with a program.

IV. FOURTH EMBODIMENT

In the knowledge synthesizing method of the foregoing embodiments, the bodies of knowledge of all experts who have contributed their knowledge to the knowledge base are treated as being equivalent. In actuality, however, the abilities of a number of experts will differ from one another. Therefore, if each body of knowledge is treated as being equal to every other, a correct knowledge base will be adversely affected by the knowledge of an expert having comparatively little ability, and this will reduce the accuracy of the results of reasoning.

The fourth embodiment of the invention is adapted to obtain accurate results of reasoning by weighting the knowledge of each of a plurality of experts.

Figure 14:
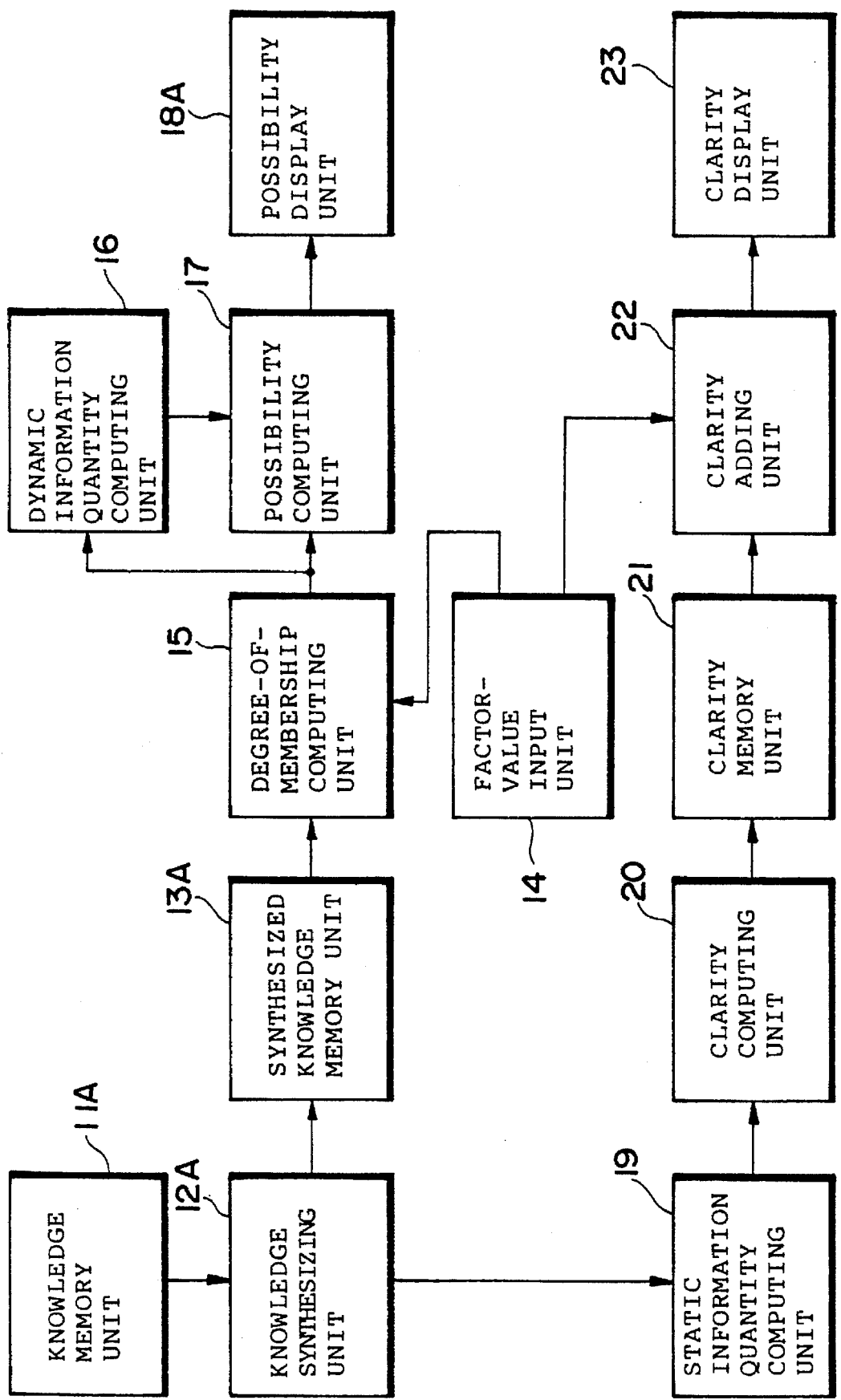
FIG. 14 is a block diagram illustrating an approximate reasoning apparatus according to fourth embodiment of the invention.

FIG. 14 illustrates the construction of an approximate reasoning apparatus according to the fourth embodiment of the present invention. Since the basic construction of this apparatus is the same as the approximate reasoning apparatus of the first embodiment shown in FIG. 1 or of the third embodiment shown in FIG. 7, identical components will be designated by like reference characters and need not be described again.

As shown in FIG. 14, a knowledge memory unit 11A stores, in addition to the expert knowledge [Eqs. (1) through (4)] indicated earlier, a plurality of weighting coefficients for the corresponding experts. Each weighting coefficient is expressed by an integer of 1 to 5, and the knowledge of each expert is weighted thereby when the knowledge base is constructed.

By way of example, consider knowledge for obtaining a conclusion $1(c_1)$ from a factor $1(f_1)$. The weighting coefficients of the experts $ex_1$, $ex_2$ are as follows:

expert $ex_1$: 5 expert $ex_2$: 3

The weighted mean $mw_{min}$ of minimum values and the weighted mean $mw_{max}$ of maximum values are calculated in the following manner [compare these equations with Eqs. (7) and (8)]:

$$mw_{min} = \frac{(20 \times 5) + (30 \times 3)}{(5+3)} \tag{36}$$
$$= 23.8$$

$$mw_{max} = \frac{(60 \times 5) + (50 \times 3)}{(5+3)} \tag{37}$$
$$= 56.3$$

The weighted standard deviation $\sigma w_{min}$ of minimum values and the weighted standard deviation $\sigma w_{max}$ of maximum values are calculated in the following manner [compare these equations with Eqs. (9) and (10)]:

$$\sigma w_{min} = \left[ \frac{(20^2 \times 5) + (30^2 \times 3)}{(5+3)} - mw_{min}^2 \right]^{1/2} \tag{38}$$
$$= 4.8$$

$$\sigma w_{max} = \left[ \frac{(60^2 \times 5) + (50^2 \times 3)}{(5+3)} - mw_{max}^2 \right]^{1/2} \tag{39}$$
$$= 4.8$$

A knowledge synthesizing unit 12A combines the knowledge of the experts in the above-described manner using the weighting coefficients thereof, and stores the combined knowledge in a memory unit 13A.

When such processing for weighting and combining the knowledge of the experts is carried out for all minimum and maximum values of each factor participating in each conclusion with regard to the above-mentioned rules [Eqs. (1) through (4)], the following table is obtained (compare this with Table 3):

TABLE 17

| | CONCLUSION | | | | | | | |
|---|---|---|---|---|---|---|---|---|
| | $c_1$ | | | | $c_2$ | | | |
| | MINIMUM VALUE | | MAXIMUM VALUE | | MINIMUM VALUE | | MAXIMUM VALUE | |
| FACTOR | AV. VALUE | STAND. DEV. | AV. VALUE | STAND. DEV. | AV. VALUE | STAND. DEV. | AV. VALUE | STAND. DEV. |
| f1 | 23.8 | 4.8 | 56.3 | 4.8 | 43.8 | 4.8 | 76.3 | 4.8 |
| f2 | 3.8 | 4.8 | 36.3 | 4.8 | 63.8 | 4.8 | 96.3 | 4.8 |

Writing Eqs. (36) through (39) as a general expression, we have the following, where Vi represents the knowledge value of expert $ex_i$ and $W_i$ the weighting coefficient of this expert.

Weighted mean value S:

$$S = \sum_{i=0}^{N} V_i \cdot W_i / \Sigma W_i \quad (40)$$

In Eq. (40), N represents the number of experts. When the knowledge value $V_i$ has not been given, the weighting coefficient $W_i$ is made zero.

Weighted variance $\sigma^2$ or weighted standard deviation $\sigma$:

$$\sigma^2 = \left( \sum_{i=1}^{N} V_i^2 \cdot W_i / \sum_{i=1}^{N} W_i \right) - S^2 \quad (41)$$

Approximate reasoning (computation of possibility and clarity) using such synthesized knowledge is the same as in the first through third embodiments.

The following modifications are possible:

(1) Expression of weight

In this embodiment, weighting coefficients are expressed by integral values of 1 to 5. However, other methods of expression are permissible if the values are non-negative real numbers and the larger the value, the greater the weight.

(2) Method of weighting rule units

In this embodiment, weighting is applied to experts on an individual basis. However, applying weighting to rules on an individual basis will make it possible to perform knowledge weighting in line with the intentions of the experts by giving a large weight to rules which fall within an expert's speciality and in which the expert is confident, and a small weight to rules which do not fall within an expert's speciality and in which the expert has comparatively little confidence.

(3) Other expressions of knowledge

In this embodiment, the synthesizing of knowledge is performed utilizing weighted mean and weighted standard deviation. In the method of synthesizing knowledge described below, however, a method of expressing the weighting of experts is considered.

① Expression by step approximation

Figure 15:
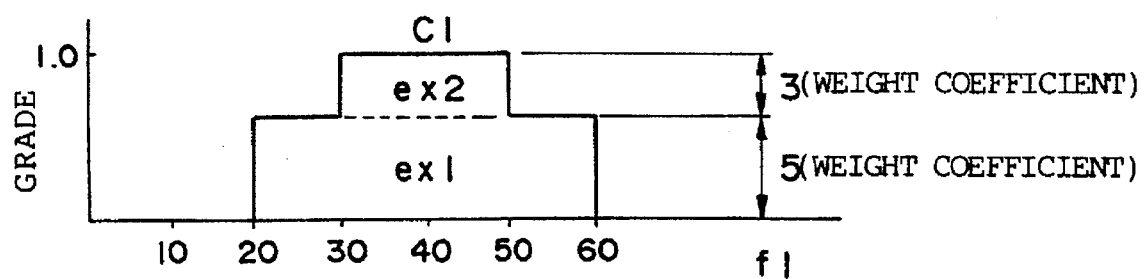
FIGS. 15, 16, 17 and 18 illustrate methods of weighting knowledge.
Figure 16:
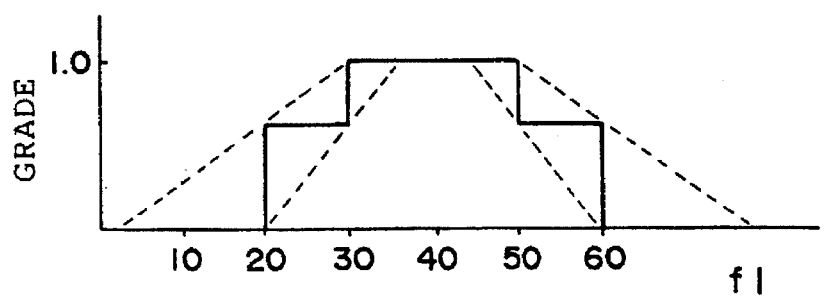

With regard to the knowledge and weights of experts in case of the example described above, a method can be conceived in which knowledge is expressed in the form of steps and combined, a membership function is formed and the weights of the experts are reflected in terms of height, as shown in FIG. 15. In a case such as this, interpolation based upon connecting the corners of the steps by straight lines, as shown in FIG. 16, also is conceivable.

Other interpolation methods also are possible.

By adopting an expression of this type, weight can be expressed without finding a mean and standard deviation for the purpose of utilizing a Gaussian distribution.

② Expression by other methods of approximation

Figure 17:
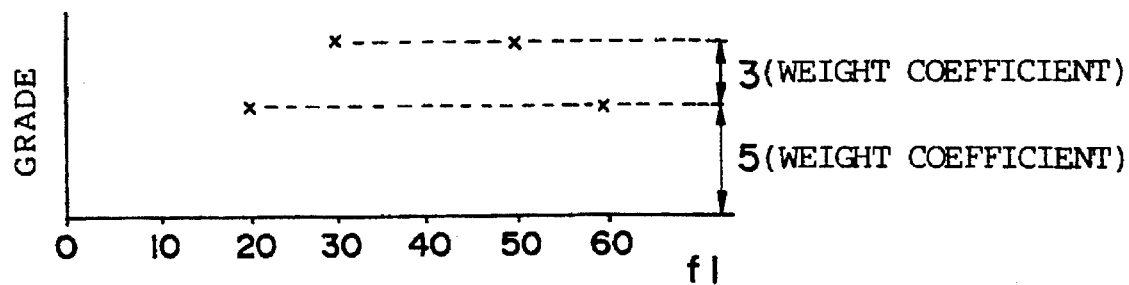
Figure 18:
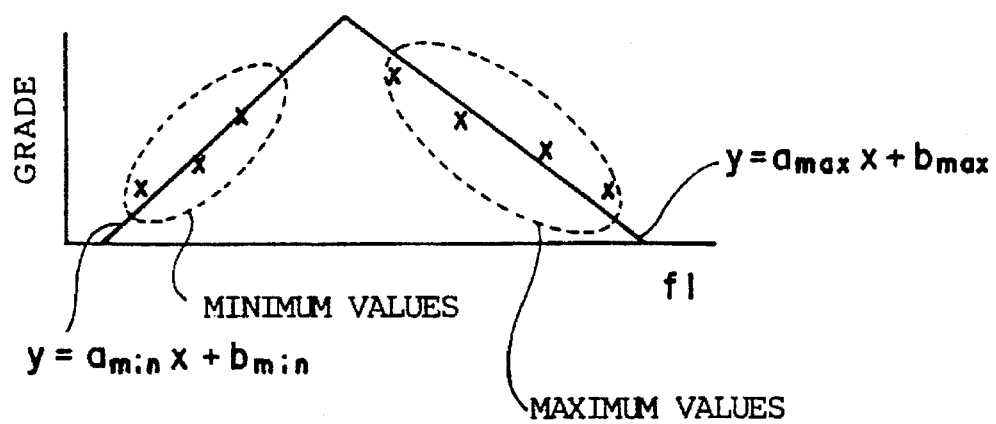

With regard to the knowledge of experts in case of the example described above, the points of intervals of $f_1$ given by the knowledge of each expert are plotted, as illustrated in FIG. 17.

Methods are conceivable in which MF is by ahesized by approximating these points based upon regression or by interpolating the points through utilization of a spline function.

(a) In case of linear regression, approximation is performed by a regression line relating to a group of points giving minimum values and a regression line relating to a group of points giving maximum values. It is possible to obtain these coefficients $a_{min}$, $b_{min}$, $a_{max}$, $b_{max}$ by the method of least squares. Another possible method is to carry out approximation by a regression curve in the same manner.

(b) A method is possible in which use is made of interpolation by way of a spline function.

In the arrangement described above, the approximate reasoning apparatus of the invention includes the knowledge memory unit 11A for entering the weights of experts, the knowledge synthesizing unit 12A for synthesizing knowledge based upon the entered weight applied to each expert, and the synthesized knowledge memory unit 13 for storing the synthesized knowledge. The apparatus is adapted to eliminate deficiencies in knowledge stemming from differences among the abilities of the various experts. This makes it possible to obtain more accurate results of reasoning.

V. FIFTH EMBODIMENT

Figure 19:
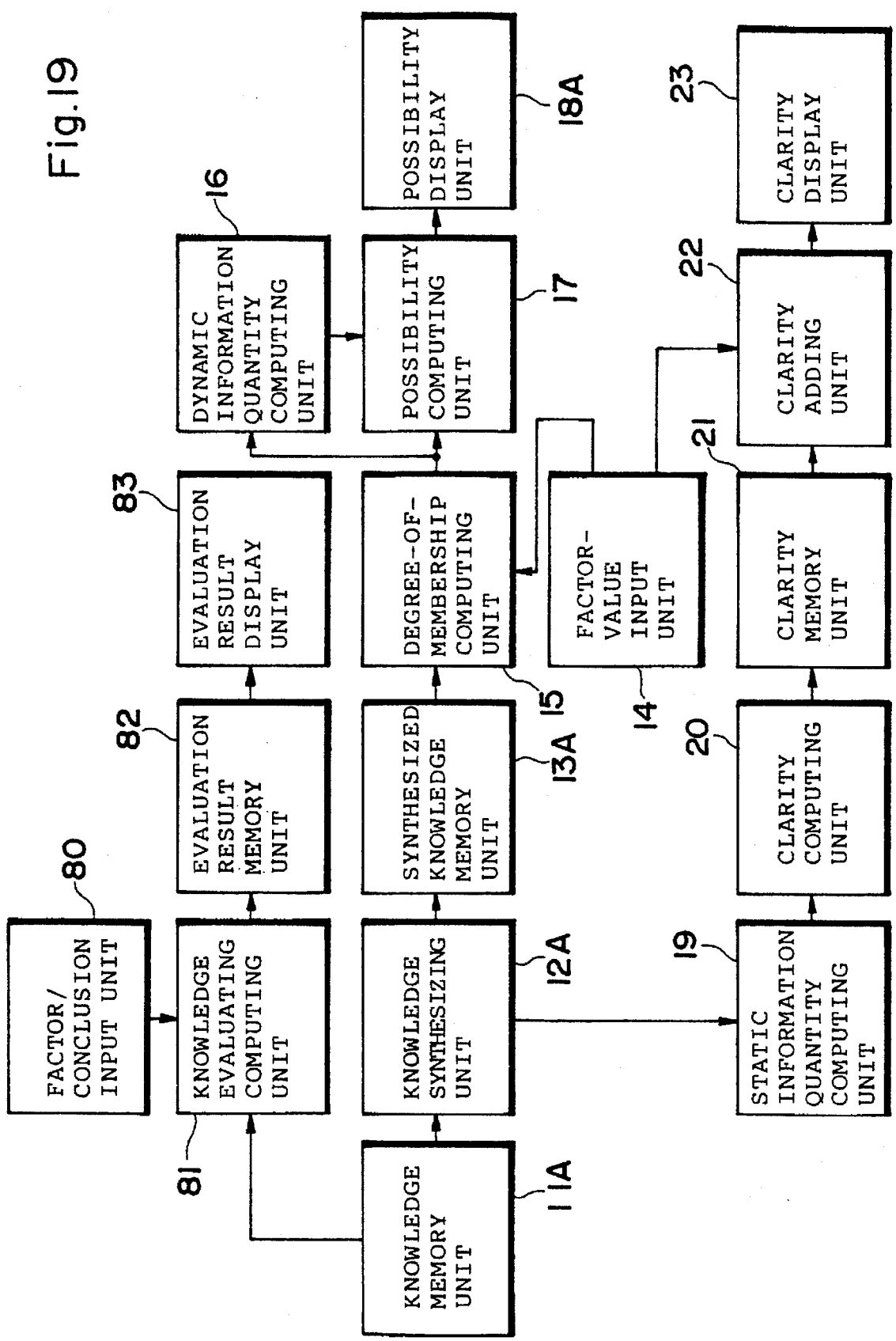
FIG. 19 is a block diagram illustrating an approximate reasoning apparatus and a knowledge evaluating apparatus according to fifth embodiment of the invention.

FIG. 19 is a block diagram illustrating an approximate reasoning apparatus and a knowledge evaluating apparatus according to fifth embodiment of the invention. In FIG. 19, portions identical with those shown in FIGS. 1, 6, 7 and 14 are designated by like reference characters and need not be described again. The knowledge memory unit 11A, knowledge synthesizing unit 12A and synthesized knowledge memory unit 13A need not perform weighting.

The knowledge evaluating apparatus according to this embodiment includes a factor/conclusion input unit 80, a knowledge evaluation computing unit 81, an evaluation result memory unit 82, and an evaluation result display unit 83.

The factor/conclusion input unit 80 is for inputting factors and the correct conclusion corresponding thereto. The unit is so adapted that these inputs can be made utilizing a keyboard, communication interface, memory, file, etc.

In a case where a factor (phenomenon) and the correct conclusion (cause) are not clearly in fault diagnosis or the like, it is necessary that reasoning be performed upon entering the factor in the approximate reasoning apparatus on site.

At such time, it is possible to adopt an arrangement in which only a definite conclusion is entered by the factor/conclusion input unit 80, and an item inputted in order to initiate reasoning with regard to a factor is read in from the approximate reasoning apparatus on-line.

The knowledge evaluation computing unit 81 is for evaluating knowledge to be stored in the knowledge memory unit 11A utilizing the factors and the correct conclusion corresponding thereto.

Based upon whether a factor-input value which causes a conclusion to hold true has been provided in the interval data of the factor corresponding to the conclusion given by an expert, the knowledge evaluating unit 81 evaluates the knowledge given by this expert.

The purposes of the knowledge evaluating unit 81 are to inform an expert of the fact that the expert's knowledge is erroneous, and to provide a learned-knowledge synthesizing unit with a parameter for the purpose of carrying out learning.

In order to notify an expert of the fact that knowledge is erroneous, a display is presented on the evaluation result display unit 83 in the form of a table or natural language, or an erroneous knowledge ratio given indicated below is display on the display unit 83.

Let Fr represent the erroneous knowledge ratio, Ra the total number of intervals of given factors, and Rf the number of intervals of erroneous factors. The erroneous knowledge ratio will then be expressed as follows:

$$Fr = \frac{Rf}{Ra} \qquad (42)$$

A method of evaluating knowledge will now be described.

By way of example, assume that the knowledge of experts has been set as follows:

Expert $ex_1$:
  if $10 \leq f_1 \leq 50$ then $c_1$

Expert $ex_2$:
  if $10 \leq f_1 \leq 40$ then $c_1$

Expert $ex_3$:
  if $0 \leq f_1 \leq 70$ then $c_1$

The value of an actual factor and the correct conclusion corresponding thereto are indicated as follows:

Factor: $f_1 = 45$
Conclusion: $c_1$

Figures 21, 22:
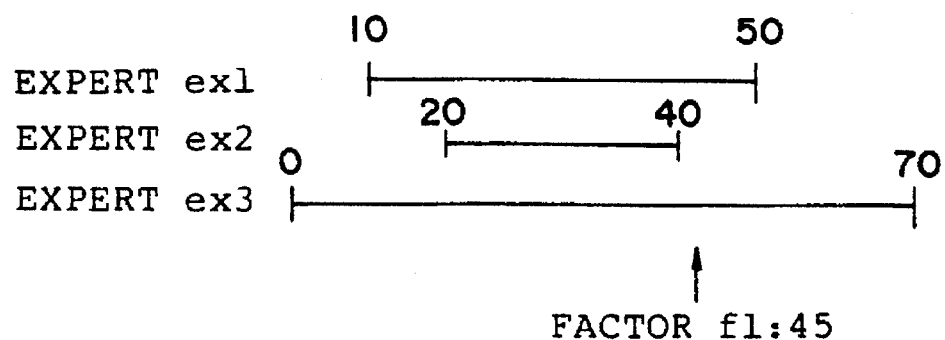
FIG. 21 illustrates relationships between the knowledge of experts and a factor value.
FIG. 22 shows the results of evaluation.

The relationship between the factor and the knowledge of each expert is as illustrated in FIG. 21.

It will be appreciated from the foregoing example that the knowledge of expert $ex_2$ will not be correct if $c_1$ is the actual conclusion in a case where an input in which the value of factor $f_1$ is 45 is obtained.

Further, knowledge is erroneous also in a case where a certain expert has not given the factor $f_1$ as a rule with regard to the conclusion $c_1$. Accordingly, extraction of this knowledge is performed.

The processing illustrated in the foregoing is executed with regard to the entered factor and the knowledge of all experts, incorrect knowledge is extracted and, at the same time, these results are stored in the evaluation result memory unit 82.

The evaluation result memory unit 82 stores the results of evaluation performed by the knowledge evaluation computing unit 81. These results are stored in the form of the table shown in FIG. 22. The factor value is the value of the inputted fact.

The foregoing table relates to the expert $ex_2$. Such a table is created for each expert who has given erroneous knowledge.

The evaluation result display unit 83 displays the results of evaluation that have been stored in the evaluation result memory unit 82. As for the method of displaying the evaluated results, the table of the foregoing example can be presented on a display, the results of evaluation can be transmitted via communication and stored in a memory or file, or the results can be delivered to a printer to be printed out.

In addition, the form of the display can be in natural language, as follows:

"Expert $ex_2$:
  if $20 \leq f_1 40$ then $c_1$

Whereas, the value of factor $f_1$ corresponding to the actual conclusion is 45."

Figure 20A:
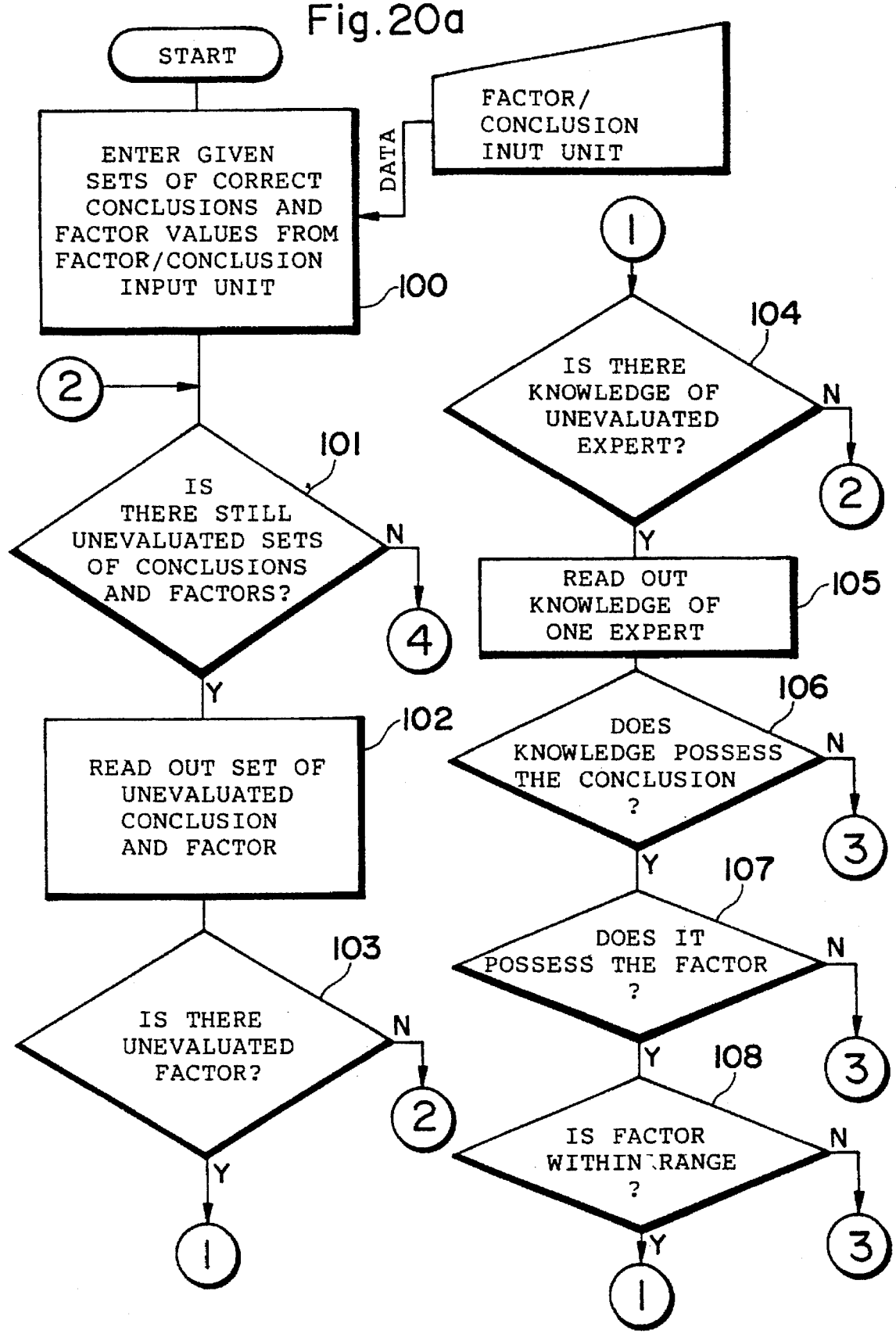
FIGS. 20a and 20b are flowcharts illustrating the operation of a knowledge evaluating apparatus.
Figure 20B:
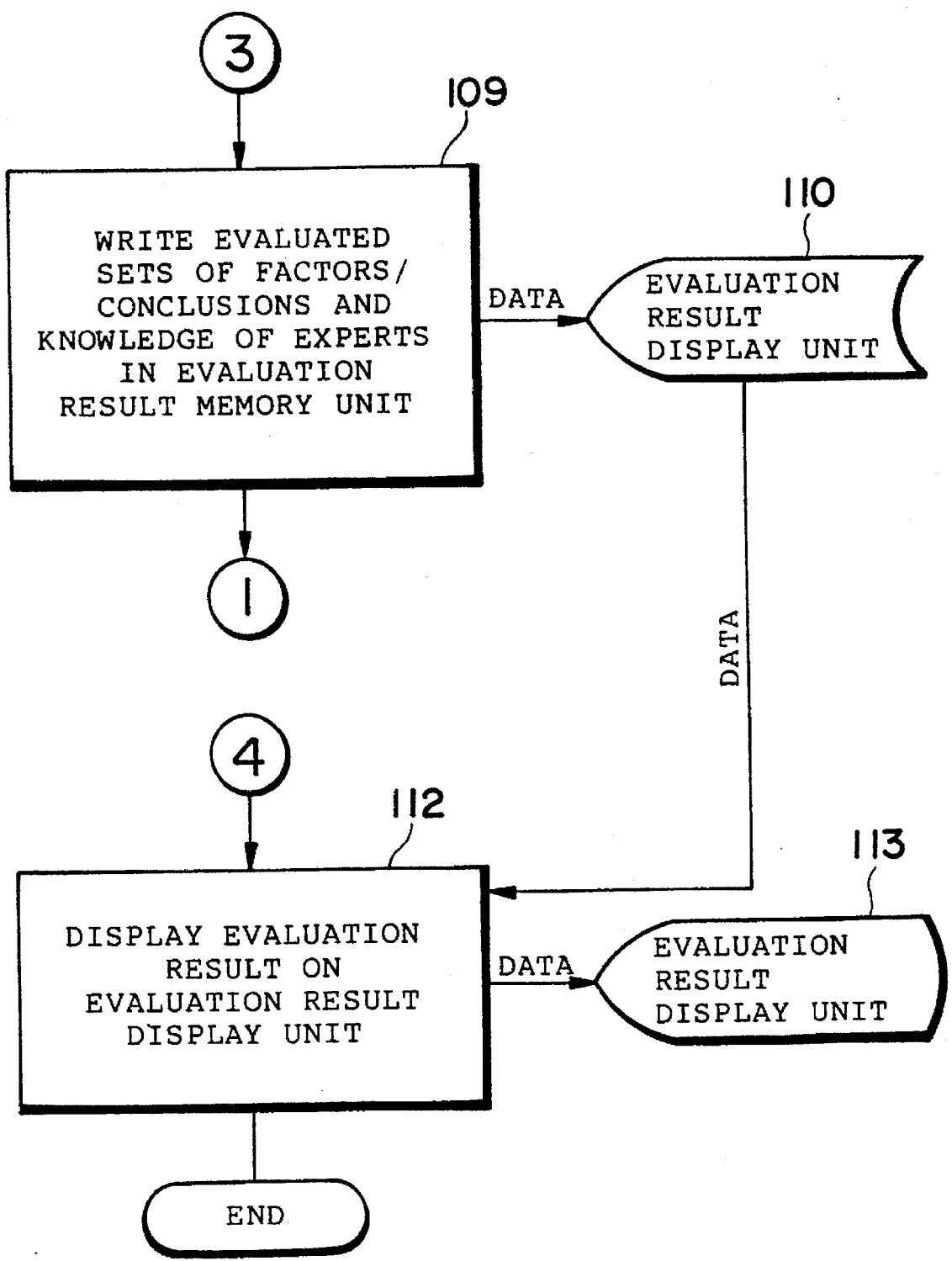

Next, the operation of the knowledge evaluating apparatus according to this embodiment will be described based upon the flowcharts of FIGS. 20a and 20b.

It is assumed in these flowcharts that sets of a plurality of conclusions and a correct factor (or factors) corresponding thereto have been given simultaneously. The principal features of the processing are illustrated.

First, when the power supply is turned on, the apparatus is started and, at step 100, the given sets of correct conclusions and factor values are inputted from the factor/conclusion input unit 80.

When this has been done, the program proceeds to step 101, at which an inquiry is made as to whether there is sets of conclusions and factors as yet unevaluated. If the answer is YES (affirmative), the program proceeds to step 102, at which an unevaluated set of a conclusion and a factor is read out, after which the program proceeds to step 103.

Here a check is made to see if the set of the conclusion and factor read at step 102 contains an unevaluated factor. If the answer is YES (affirmative), the program proceeds to step 104, at which an inquiry is made as to whether there is expert knowledge unevaluated with regard to the factor currently undergoing evaluation. If the answer is YES (affirmative), the program proceeds to step 105, at which the knowledge of this expert is read out. This is followed by step 106, at which an inquiry is made as to whether there the knowledge of the expert currently undergoing evaluation possesses the conclusion currently undergoing evaluation. If the answer is YES (affirmative), the program proceeds to step 107, at which it is determined if the knowledge possesses a factor. This is followed by step 108.

At step 108, an inquiry is made as to whether the knowledge of the expert contains the factor currently undergoing evaluation with the rage thereof. If the answer is YES (affirmative), the program returns to step 100, where the apparatus waits for entry of the next item of information.

If the answer received at step 108 is NO (negative), the program proceeds to step 109. Here the evaluated set of the factor and conclusion and the knowledge of the expert knowledge are written in the evaluation result memory unit 82. Then, at step 110, this data is stored in the evaluation result memory unit 82. Next, at step 112, the data indicative of the results of evaluation is sent from the evaluation result memory unit 82 to the display unit 83. These results are displayed on the display unit 83 at step 113. When this has been completed, processing ends.

If a NO (negative) answer is received a step 101, the program proceeds immediately to step 112 and thence to step 113, where the data is displayed on the display unit 83. When this has been completed, processing ends.

When a NO (negative) answer is obtained at step 106 or 107, the program proceeds to step 109 and the operation from steps 109 to 113 is repeated.

Thus, processing proceeds as follows:

(1) One set of a conclusion and a factor is read out, the expert knowledge that has been stored in the knowledge memory unit 11A is read out for one expert at a time, and evaluation is performed. If the evaluation of all sets of conclusions and factors and all sets of expert knowledge has been completed, the results of evaluation are read out of the evaluation result memory unit 82 and these results are displayed on the display unit 83.

(2) If, at the time of evaluation, the knowledge of an expert possesses a conclusion currently undergoing evaluation, the factors in this knowledge are evaluated.

(3) If a factor currently undergoing evaluation has not been given with regard to a conclusion currently undergoing evaluation in the knowledge of the expert currently undergoing evaluation, then this knowledge is construed to be erroneous and the results are written in the memory unit 82.

(4) If a factor currently undergoing evaluation has been given with regard to a conclusion currently undergoing evaluation in the knowledge of the expert currently undergoing evaluation, then the factor of the knowledge of this expert is compared with the factor undergoing evaluation. If the latter is outside the range of the factor of this expert knowledge, the knowledge of this expert is construed to be erroneous and the results are written in the memory unit 82.

(5) If evaluation of a factor undergoing evaluation has been completed for the knowledge of all experts, then processing from (3) onward is performed in similar fashion in relation to the next factor.

(6) If evaluation of a conclusion undergoing evaluation has been completed for the knowledge of all experts, then processing from (2) onward is performed in similar fashion in relation to the next conclusion.

(7) If the knowledge of the expert does not possess a conclusion currently undergoing evaluation in step (2) above, the knowledge of this expert is construed to be erroneous and the results are written in the memory unit 82.

According to this algorithm, a plurality of sets of conclusions and factors are given simultaneously. However, even if a set is given at a time, the results of evaluation are stored in the memory unit 82, and therefore no problems arise in terms of function.

The actions and effects of the apparatus according to this embodiment will now be described.

(1) It is possible to train experts by evaluating their knowledge based upon the relationship between actual factors and conclusions.

(2) Since erroneous knowledge can be detected, this knowledge can be revised, thereby making it possible to execute approximate reasoning utilizing correct knowledge.

Furthermore, this embodiment can be modified in the following ways:

(1) In this embodiment, the knowledge evaluation computing unit 81 compares factors and the expert knowledge stored in the knowledge memory unit 11A and, at the same time, writes the results of evaluation in the evaluation result memory unit 82. However, high speed can be obtained by constructing a buffer memory, the access speed of which is greater than that of the evaluation result memory unit 82, within the knowledge evaluation computing unit 81.

(2) Similarly, as in (1) above, processing for knowledge evaluation can be speeded up, when reading the expert knowledge out of the memory unit 11A, by constructing a buffer memory, the speed whereof is greater than that of the knowledge memory unit 11A, within the knowledge evaluation computing unit 81.

VI. SIXTH EMBODIMENT

Figure 23:
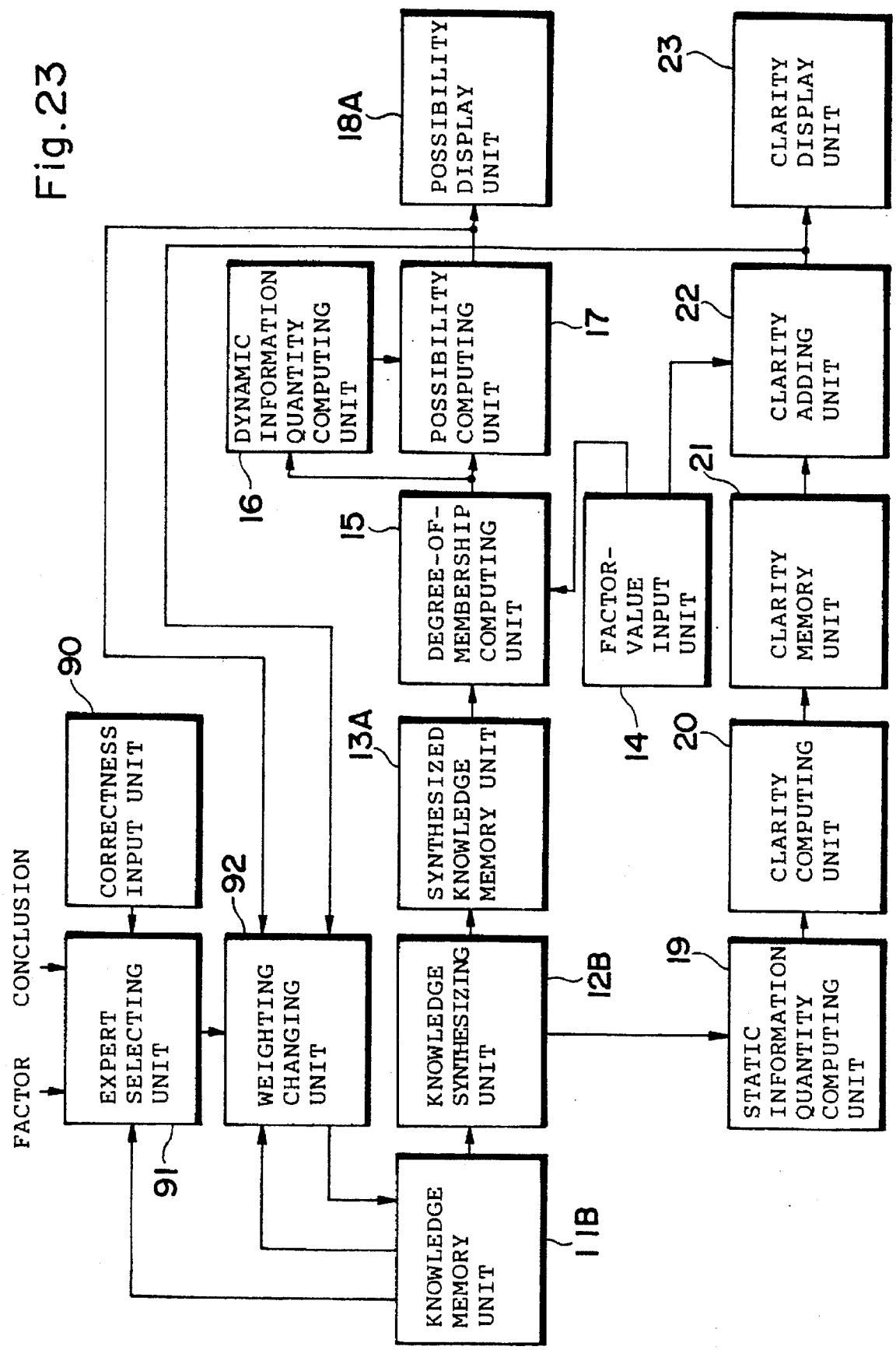
FIG. 23 is a block diagram showing an approximate reasoning apparatus and learning-type knowledge synthesizing apparatus according to a sixth embodiment of the present invention.

FIG. 23 illustrates an approximate reasoning apparatus and a learning-type knowledge synthesizing apparatus according to a sixth embodiment of the invention. Portions identical with those shown in FIGS. 1, 6, 7, 14 and 19 are designated by like reference characters and need not be described again.

The learning-type knowledge synthesizing apparatus includes a correctness input unit 90 used as input means for inputting a decision regarding the correctness of a result of reasoning performed based upon knowledge from a plurality of experts, an expert selecting unit 91 used as for selecting means for selecting, based upon the decision regarding correctness inputted by the correctness input unit 90, which knowlege of an expert among the plurality thereof is to have its weight altered, a weighting changing unit 92 for calculating and changing the weight of the knowledge selected by the expert selecting unit 91, a knowledge memory unit 11B used as memory means for storing the weight calculated by the weighting changing unit 92, and a knowledge synthesizing unit 12B used as knowledge re-synthesizing means for automatically re-synthesizing knowledge based upon the weight calculated by the weighting changing unit 92.

Processing is executed in the order of the correcting input unit 90, expert selecting unit 91 and weighting changing unit 92, after which knowledge synthesis is performed by the knowledge synthesizing unit 12B utilizing the changed expert weighting.

Each of these units will now be described in detail.

First, the correctness input unit 90 is for allowing the user to make an entry as to the correctness of a result of reasoning. In certain instances a plurality of conclusions are applied to the input unit 90. When such is the case, the user makes an entry as to the correctness of all of the conclusions applied.

In this embodiment, an example will be illustrated in which, when a conclusion resulting from reasoning is erroneous, the fact that this conclusion is erroneous is entered.

More specifically, the processing executed by this apparatus when $c_1$ is obtained as the result of reasoning and this conclusion is incorrect will now be described.

Upon deciding that the conclusion $c_1$ is incorrect, the user enters this fact using the correctness input unit 90. The input unit 90 can be a keyboard or can utilize a mouse, a touch panel or the like.

When the conclusion considered to be incorrect has been entered from the correctness input unit 90, the expert selecting unit 91, based upon a rule indicating the relationship between the factors and conclusion used in this reasoning, determines which expert has provided the incorrect knowledge and selects the expert whose weight is to be changed.

The knowledge of each expert is as illustrated in the fourth embodiment. Further, the input values of the factors are as follows:

factor $f_1$: 25
factor $f_2$: 35

The knowledge of each expert having $c_1$ as the conclusions is as follows, as described earlier:

Expert $ex_1$: (1)
if $20 \leq f_1 \leq 60, 0 \leq f_2 \leq 40$ then $c_1$

Expert $ex_2$: (2)
if $30 \leq f_1 \leq 50, 10 \leq f_2 \leq 30$ then $c_1$

The knowledge of an expert in which a range including given factor values is given as a rule can be set to be erroneous.

Figure 24:
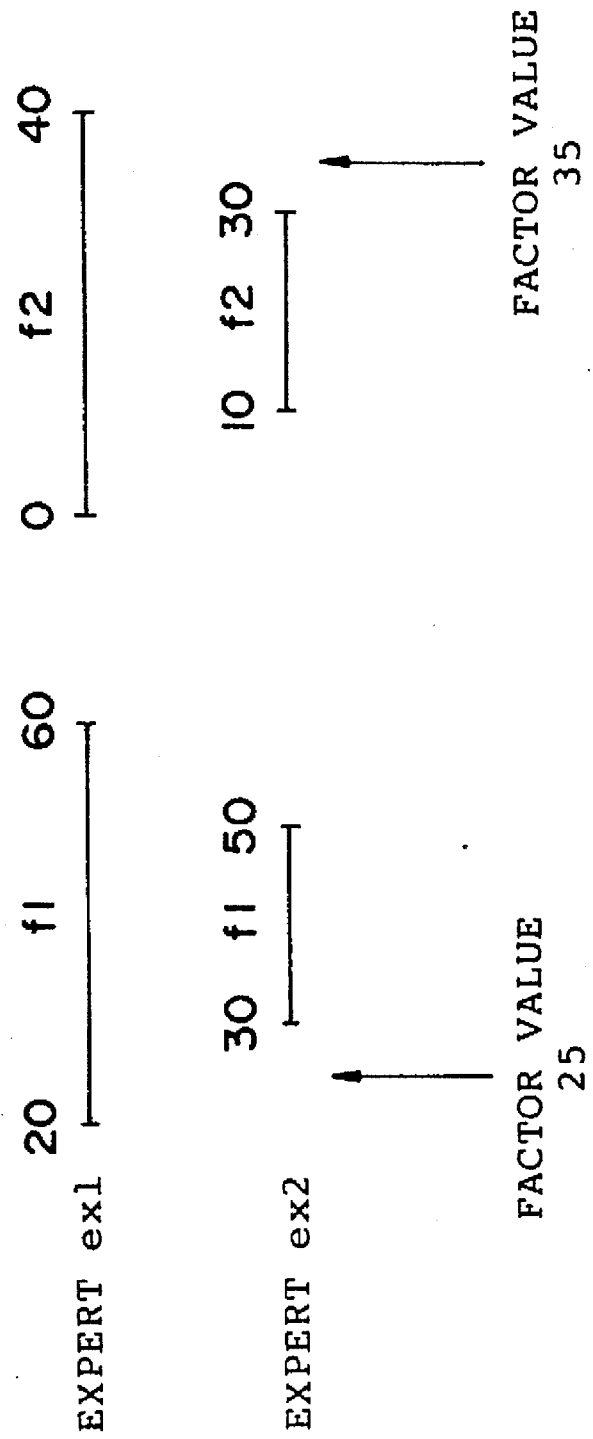
FIG. 24 illustrates relationships between the knowledge of experts and factor values.

Accordingly, it can readily be understood from FIG. 24 that the expert who has given rules that deduce the conclusion $c_1$ from the given factor values $f_1$:25 and $f_2$:35 is the expert ex1.

When the user has entered the erroneous conclusion, the expert selecting unit 91 reads out the factor values utilized in deducing this conclusion and the rules of the expert stored in the knowledge memory unit 11B, after which it determines whether there is a factor value contained in the range of factors given by these rules, thereby selecting the expert who has given the erroneous rules possessing the range of factors which includes this factor value.

In a case where the knowledge of all experts is found to be erroneous by this processing, weighting is meaningless and it will be necessary to alter the rules.

In this embodiment, a method has been illustrated in which the selection of an expert is performed based upon an erroneous conclusion. However, selection of an expert when the result of reasoning is correct also can be performed in a similar manner.

If an expert whose weight is to be changed has been decided, the weighting changing unit 92 changes the weight of this expert.

In this embodiment, a case is illustrated in which the result of reasoning is erroneous. In other words, the weight of an expert whose has given rules that lead to an incorrect conclusion is reduced.

An equation for changing weight is as follows:

$$W_n = \begin{cases} W_{n-1} - C_0 \times P_{c1} \times Cl_{c1} \text{ (in case of } (W_{n-1} \geq C_0 \times P_{c1} \times Cl_{c1}) \\ 0 \text{ (in case of } W_{n-1} < C_0 \times P_{c1} \times Cl_{c1}) \end{cases} \quad (43)$$

$W_n$: weight after change $W_{n-1}$: weight before change n: number of times weighting is changed $C_0$: weighting-change coefficient $P_{c1}$: possibility regarding erroneous conclusion ($c_1$)

$Cl_{c1}$: clarity regarding erroneous conclusion ($c_1$)

The weighting-change coefficient decides the size of a weighting-change value. By giving the possibility and clarity of a conclusion, a weighting change that reflects these values can be carried out. In other words, if a conclusion for which the possibility is high is erroneous, the weight of the particular expert is subjected to a large change. Further, if a conclusion for which the clarity is high is erroneous, the weight of the expert is subjected to a large change.

The weighting changing unit 92 reads in the weight of an expert, whose weighting is to be changed, from the knowledge memory unit 11B, changes the weighting based upon the above-mentioned equation by using the read value as well as the possibility and clarity of the conclusion, and writes the result in the knowledge memory unit 11B. Thereafter, knowledge is synthesized by the knowledge synthesizing unit 12B in the same manner as set forth in the fourth embodiment, and the result is stored in the synthesized knowledge memory unit 13A. With regard to static information quantity and clarity, re-computation is performed in the manner described earlier and the result is stored in the clarity memory unit 21.

In this embodiment as described above, the change in weighting is computed in accordance with the aforementioned equation. However, it is possible to change weighting by employing an equation in which weight is reduced when a conclusion is erroneous and increased when a conclusion is correct.

Further, in this embodiment, the knowledge synthesizing unit 12B performs knowledge synthesis in the same way as the knowledge synthesizing unit 12A illustrated in the fourth embodiment. If the result is as set forth in the example illustrated above, the weight of expert ext is reduced. As a result, the shape of the membership function changes.

Next, the operation of the learning-type knowledge synthesizing apparatus of this embodiment constructed as set forth above will be described.

Based upon the result of evaluation performed by the knowledge evaluation computing unit 81 described in the fifth embodiment, the learning-type knowledge synthesizing apparatus of this embodiment changes the weighting of an expert and utilizes the result of the change to perform knowledge synthesis, thereby carrying out learning. There are two methods of changing weighting.

① In a case where information indicating that knowledge is erroneous is given as binary value (correct or not correct) by the knowledge evaluation computing unit 81 when learning timing is implemented with regard to a factor entered a single time, weighting is changed in accordance with Eq. (43) indicated in the description of the weighting changing unit 92.

② In a case where an erroneous knowledge ratio is given by the knowledge evaluation computing unit 81 when learning timing is implemented a plurality of times, weighting is changed as follows utilizing this ratio:

$$W_n = \begin{cases} W_{n-1} - C_0 \times F_r \text{ (in case of } W_{n-1} \geq C_0 \times F_r) \\ 0 \text{ (in case of } W_{n-1} < C_0 \times F_r) \end{cases} \quad (44)$$

where Fr represents the erroneous knowledge ratio [see Eq. (42)].

In accordance with the apparatus of the sixth embodiment, the weight of an expert is changed in accordance with the correctness of a result obtained from reasoning. This provides the following advantages:

(1) It is possible to make knowledge more accurate.

(2) Knowledge is changed automatically merely by having the user enter whether or not a result obtained from reasoning is correct. This makes it possible to carry out learning.

(3) It is no longer necessary to take into account and enter the weighting of an expert in advance.

The sixth embodiment of the invention can be modified in the following ways:

(1) Though this embodiment illustrates an example in which weighting is applied to experts, an arrangement is possible in which weighting is applied to individual rule units. This will make it possible to perform learning of the individual rule units so that knowledge in which the strengths and weaknesses of experts has been absorbed can be learned.

(2) Though a weighting-change coefficient is applied at the time of knowledge input according to the foregoing embodiment, a method is conceivable in which weighting-change coefficients are given simultaneously in the correctness input unit. This will make it possible for the user to control learning.

(3) In the foregoing embodiment, weighting is applied as an initial value. However, an arrangement can be adopted in which the system gives the value of weighting of a default value. This will eliminate the need for the user to give the weight of an expert in advance.

(4) In the foregoing embodiment, a weight after being changed is stored in the knowledge memory unit 11B, then combination of the knowledge of all experts is performed again by the knowledge synthesizing unit. However, processing speed when the knowledge is combined can be raised by recombining only the knowledge contributed by experts whose weights have been changed.

VII. SEVENTH EMBODIMENT

Figure 25:
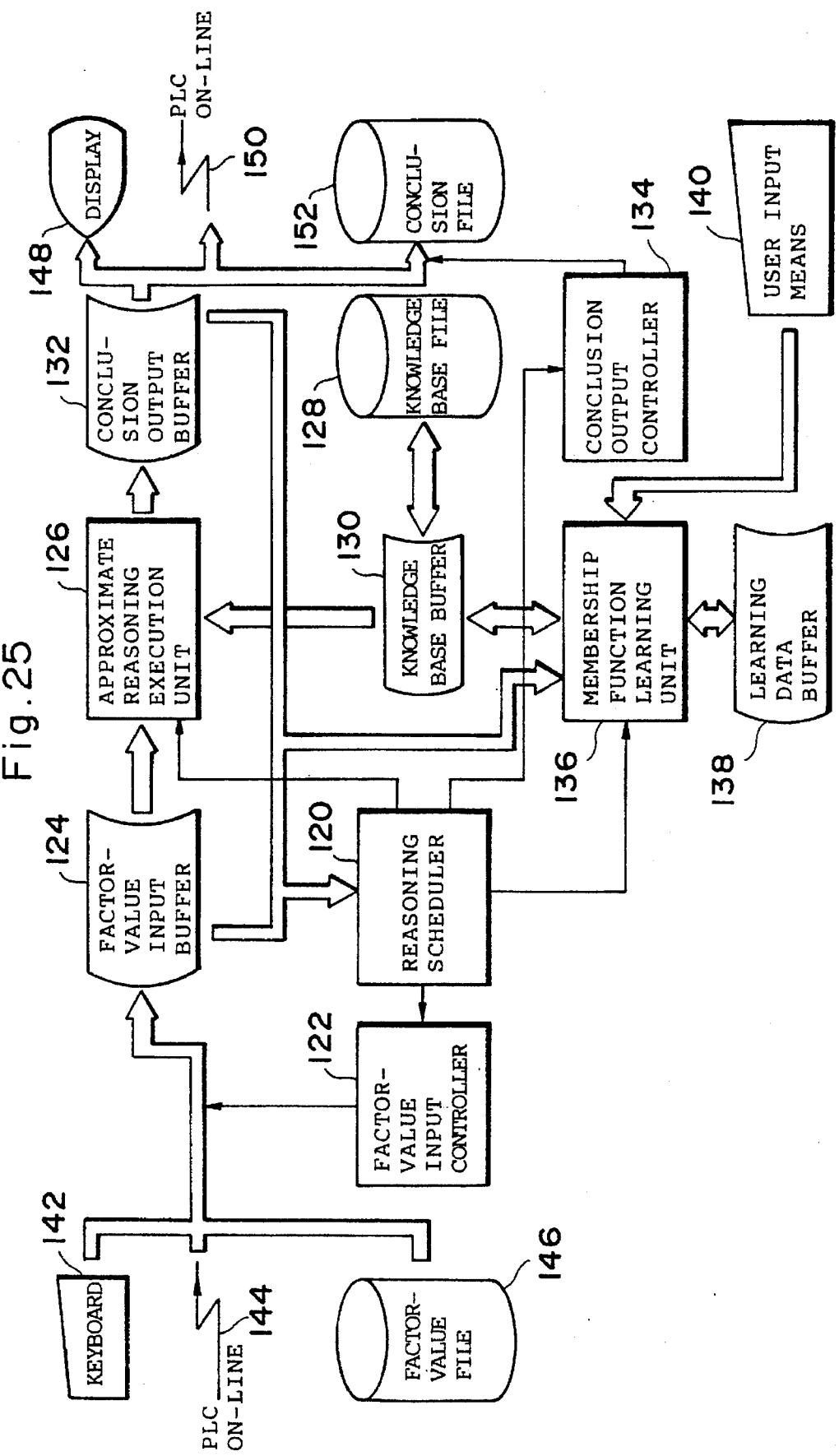
FIG. 25 is a block diagram illustrating the construction of an approximate reasoning apparatus according to a seventh embodiment of the invention.

FIG. 25 is a block diagram illustrating a seventh embodiment of an approximate reasoning apparatus according to the present invention. The approximate reasoning apparatus includes a reasoning scheduler 120, a factor-value input controller 122, a factor-value input buffer 124, an approximate reasoning execution unit 126, a knowledge base file 128, a knowledge base buffer 130, a conclusion output buffer 132, a conclusion output controller 134, a membership function learning unit 136, a learning data buffer 138, and user input means 140.

The reasoning scheduler 120 executes timing control of factor-value inputs and conclusion outputs with regard to the factor-value input controller 122 and conclusion output controller 134; control for storing, in the factor-value input buffer 124 and conclusion output buffer 132, data designating the input destination of factor values and data designating the output destination of conclusions in the knowledge base based upon information present in the knowledge base that has been stored in the knowledge base buffer 130; and timing control for learning membership functions in the membership function learning unit 136.

The factor-value input controller 122 performs control to write a factor value into the factor-value input buffer 124 in accordance with the timing provided by the reasoning scheduler 120, and to read in data from each input destination in accordance with designations of factor-value input destinations stored in the factor-value input buffer 124.

The factor-value input buffer 124, which is provided with various factor-values from a keyboard 142, from a PLC (programable controller) on-line, or from a factor-value file 146, stores these values in the form of a data table and outputs the factor values to the approximate reasoning execution unit 126 as a reasoning input.

The approximate reasoning execution unit 126 is adapted to execute approximate reasoning in accordance with the timing provided by the reasoning scheduler 120.

Approximate reasoning in the approximate reasoning execution unit 126 is carried out in dependence upon the factor value of each factor from the factor-value input buffer 124 using a membership function created, for every conclusion, with regard to each factor from the knowledge stored in the knowledge base buffer 130. The results obtained from such approximate reasoning are outputted to the conclusion output buffer 132.

The knowledge base buffer 130 is provided with the knowledge of a plurality of experts from the knowledge base file 128 and is adapted to store a converted-rule definition data table, a factor data table and a degree-of-membership data table.

The method of creating membership functions based upon expert knowledge is the same as described above with reference to FIGS. 2 through 4.

Figure 26:
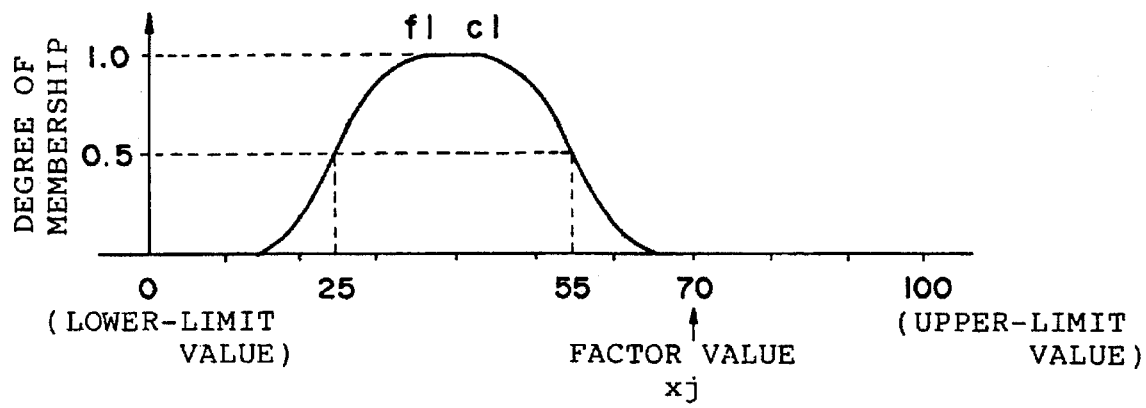
FIGS. 26 and 27 are graphs showing specific examples of membership functions based upon synthesized knowledge.
Figure 27:
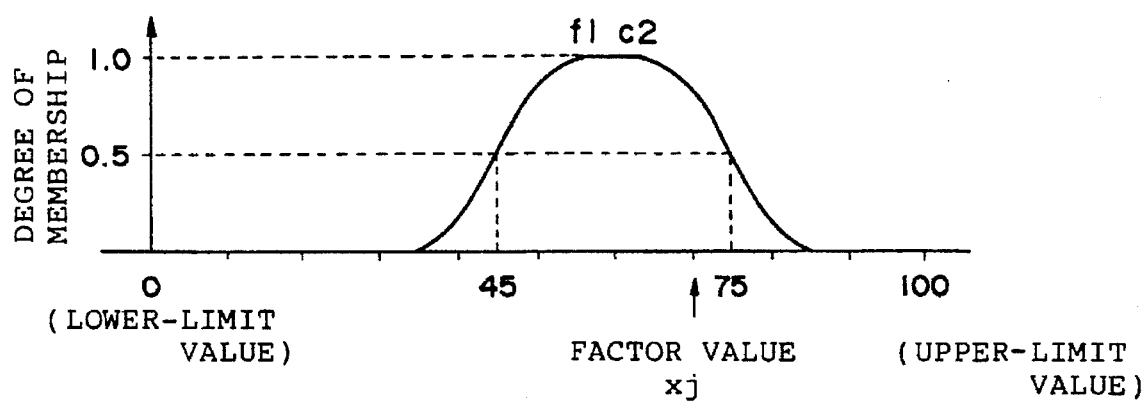
Figure 28:
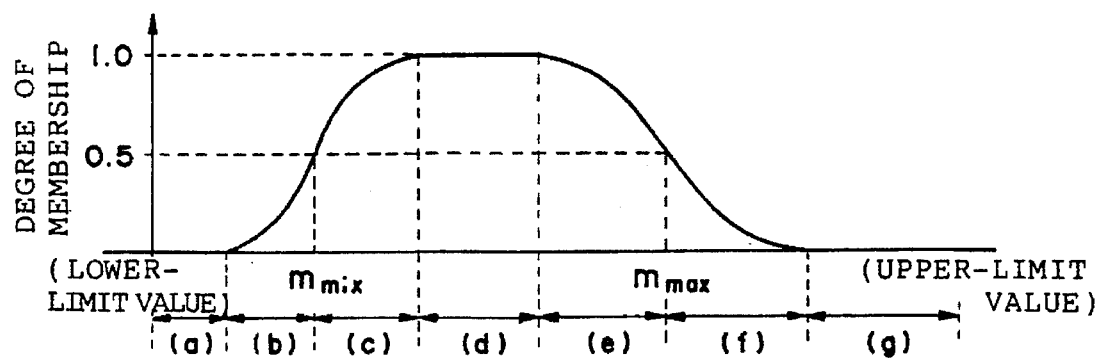
FIG. 28 is a graph showing division into factor-value intervals for learning a membership function.

FIG. 26 illustrates the membership function of conclusion $c_1$ in factor $f_1$ created based upon synthesized knowledge, and FIG. 27 illustrates the membership function of conclusion $c_2$ in factor $f_1$ created based upon synthesized knowledge (these are the same as the membership functions of FIG. 4a).

The conclusion output buffer 132, which is provided with the result of reasoning performed by the approximate reasoning execution unit 126, creates a conclusion data table and, in dependence upon the designation of the destination for the conclusion output, delivers the results of reasoning to a display 148, a PLC on-line 150 or a conclusion file 152.

The membership function learning unit 136 is provided with information, which relates to whether or not a conclusion obtained as the result of approximate reasoning is a suitable conclusion, entered from the user input means 140 serving as means for entering reasoning suitability information. The learning unit 136 stores, in the learning data buffer 138, information present in the knowledge base that has been stored in the knowledge base buffer 130 or a possibility value serving as a threshold value for performing learning entered by a user from the user input means 140, and performs learning of membership functions with regard to conclusions designated by the user and other conclusion having a possibility value equal to or greater than the aforementioned threshold value. The learning unit 136 writes the knowledge changed by learning in the knowledge base buffer 130 and then stores this in the knowledge base file 128 to update the same.

When performing such learning of a membership function, the interval between upper and lower limit values of factor values is partitioned into seven intervals (a)–(g) and consideration is given to revision of the membership function. The intervals (a) and (g) are intervals in which each degree of membership $\omega_{ij}$ (the degree of membership at factor value $x_j$ in the membership function of conclusion $c_i$ and factor $f_j$) is 0. The intervals (b)–(f) are intervals in which $\omega_{ij}$ is not zero. The interval (b) is one in which the factor-value $x_j$ is less than the mean value $m_{min}$ of minimum values; the interval (c) is one in which the factor-value $x_j$ is greater than the mean value $m_{min}$ of minimum values but the degree of membership $\omega_{ij}$ does not become 1; the interval (d) is one in which the degree of membership $\omega_{ij}$ indicates the maximum value of 1; the interval (e) is one in which the factor-value $x_j$ is greater than the mean value $m_{max}$ of minimum values but the degree of membership $\omega_{ij}$ does not indicate 1; and the interval (f) is one in which the factor-value $x_j$ is less than the mean value $m_{max}$ of maximum values.

In this embodiment, conclusions to which learning is applied are correct conclusions $c_0$ designated by the user, and conclusions $c_i$ having a possibility value $P_i$ equal to or greater than a certain possibility threshold value P in conclusions other than $c_0$. It should be noted that $c_i \neq c_0$, and that $1 \leq i \leq n$ (where n=total number of conclusions). The possibility threshold P is stored in the data of the knowledge base stored in the knowledge base buffer 130, or in the knowledge base buffer 130 by an input from the user.

Learning of the membership function of factor $f_j$ associated with the correct conclusion $c_0$ designated by the user as being suitable will now be described.

The fact that the conclusion and factor are associated means that one or more experts have defined rules with regard to this conclusion and factor.

In learning, with regard to the membership function of factor $f_j$ ($1 \leq j \leq m$, m=total number of factors) associated with conclusion $c_0$, the mean value $m_{min}$ of minimum values and mean value $m_{max}$ of maximum values in this factor and conclusion, as well as the standard deviation $\sigma_{min}$ of these minimum values and standard deviation $\sigma_{max}$ of these maximum values, are changed as follows, depending upon in which of the above-mentioned intervals the factor value $x_j$ falls, in such a manner that the degree of membership at the factor value $x_j$ of factor $f_j$ increases:

(1) In a case where the factor value $x_j$ resides within the range of interval (a) or (b):

The mean value $m_{min}$ of minimum values is reduced and the sloping portion of the membership function on the minimum side is translated to the left as seen in FIG. 26 or FIG. 27.

It will suffice if the reduction in the mean value $m_{min}$ of minimum values is performed in accordance with the following equation, by way of example:

$$m_{min} \leftarrow m_{min} - (\text{upper-limit value} - \text{lower-limit value}) \times (5/100) \quad (45)$$

where the upper-limit value is the upper limit of the factor value $x_j$, and the lower-limit value is the lower limit of the factor value $x_j$.

(2) In a case where the factor value $x_j$ resides within the range of interval (c):

The standard deviation value $\sigma_{min}$ of minimum values is reduced and the slope of the membership function on the minimum side is enlarged.

It will suffice if the reduction in the standard deviation value $\sigma_{min}$ of minimum values is performed in accordance with the following equation, by way of example:

$$\sigma_{min} \leftarrow \sigma_{min} \times 0.9 \quad (46)$$

(3) In a case where the factor value $x_j$ resides within the range of interval (d):

Since the degree of membership is at the maximum value (=1), no change is made in this case.

(4) In a case where the factor value $x_j$ resides within the range of interval (e):

The standard deviation value $\sigma_{max}$ of maximum values is reduced and the slope of the membership function on the maximum side is enlarged.

It will suffice if the reduction in the standard deviation value $\sigma_{max}$ of maximum values is performed in accordance with the following equation, by way of example:

$$\sigma_{max} \leftarrow \sigma_{max} \times 0.9 \quad (47)$$

(5) In a case where the factor value $x_j$ resides within the range of interval (f) or (g):

The mean value $m_{max}$ of maximum values is increased and the sloping portion of the membership function on the maximum side is translated to the right as seen in FIG. 26 or FIG. 27.

It will suffice if the increase in the mean value $m_{max}$ of maximum values is performed in accordance with the following equation, by way of example:

$$m_{max} \leftarrow m_{max} + (\text{upper-limit value} - \text{lower-limit value}) \times (5/100) \quad (48)$$

For example, if a value of 70 is given as the factor value $x_j$ in the membership function of factor $f_1$ of conclusion $c_1$, as shown in FIG. 26, then this will fall in the range of interval (g). Therefore, the mean value $m_{max}$ of maximum values is updated as follows:

$$m_{max} \leftarrow m_{max} - (\text{upper-limit value} - \text{lower-limit value}) \times \quad (49)$$
$$(5/100) = 55 + (100 - 0) \times (5/100) = 60$$

Figure 32:
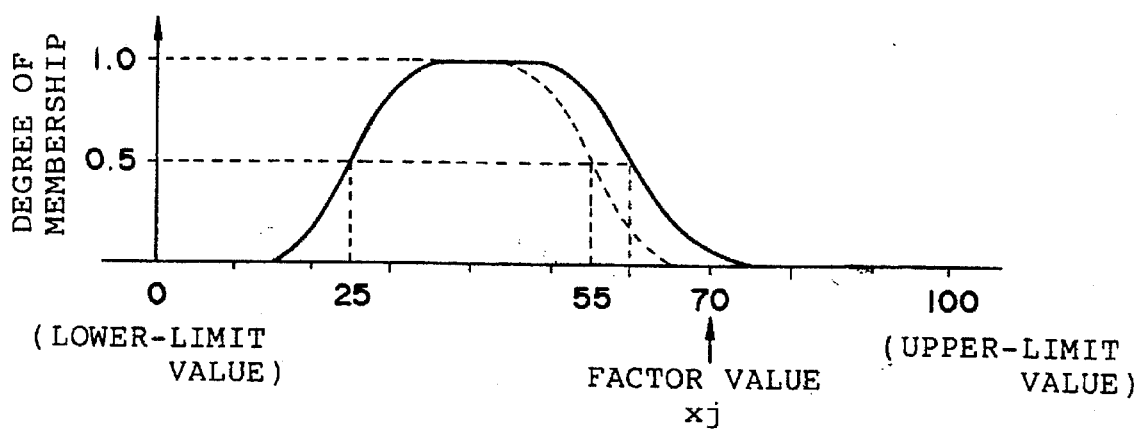
FIGS. 32 and 33 are graphs illustrating examples of revision of membership functions by learning.

When the mean value $m_{max}$ of maximum values is thus increased from 55 to 60 and a membership function is created using the updated mean value $m_{max}$=60, the result is as indicated by the solid line in FIG. 32. In comparison with the membership function before learning, as indicated by the dashed line in FIG. 32, the sloping portion on the maximum side has been translated farther to the right and the degree of membership at the factor value $x_j$=70 has been increased.

Next, for conclusions other than conclusion $c_0$, learning will be described in connection with the membership function of factor $f_j$ associated with conclusion $c_i$ having a possibility value equal to or greater than a predetermined threshold value P, namely a conclusion which is unsuitable.

Here also, the fact that the conclusion and factor are associated means that one or more experts have defined rules with regard to this conclusion and factor.

In learning, with regard to the membership function of factor $f_j$ ($1 \leq j \leq m$, m=total number of factors) associated with conclusion $c_i$, the mean value $m_{min}$ of minimum values and mean value $m_{max}$ of maximum values in this factor and conclusion, as well as the standard deviation $\sigma_{min}$ of these minimum values and standard deviation $\sigma_{max}$ of these maximum values, are changed as follows, depending upon in which of the above-mentioned intervals the factor value $x_j$ falls, in such a manner that the degree of membership at the factor value $x_j$ of factor $f_j$ decreases:

(1) In a case where the factor value $x_j$ resides within the range of interval (a) or (g):

Since the degree of membership is at the minimum value (=0), no change is made in this case.

(2) In a case where the factor value $x_j$ resides within the range of interval (b):

The standard deviation value $\sigma_{min}$ of minimum values is reduced and the slope of the membership function on the minimum side is enlarged.

It will suffice if the reduction in the standard deviation value $\sigma_{min}$ of minimum values is performed in accordance with the following equation, by way of example:

$$\sigma_{min} \leftarrow \sigma_{min} \times 0.9 \quad (50)$$

(3) In a case where the absolute value of the difference between the mean value $m_{min}$ of minimum values and the factor value $x_j$ is less than the absolute value of the difference between the mean value $m_{max}$ of maximum values and the factor value $x_j$, and the factor value $x_j$ resides within the range of interval (c) or (d):

The mean value $m_{min}$ of minimum values is increased and the sloping portion of the membership function on the minimum side is translated to the right as seen in FIG. 26 or FIG. 27.

It will suffice if the increase in the mean value $m_{min}$ of minimum values is performed in accordance with the following equation, by way of example:

$$m_{min} \leftarrow m_{min} + (\text{upper-limit value} - \text{lower-limit value}) \times (5/100) \quad (51)$$

(4) In a case where the absolute value of the difference between the mean value $m_{min}$ of minimum values and the factor value $x_j$ is greater than the absolute value of the difference between the mean value $m_{max}$ of maximum values and the factor value $x_j$, and the factor value $x_j$ resides within the range of interval (d) or (e):

The mean value $m_{max}$ of maximum values is decreased and the sloping portion of the membership function on the maximum side is translated to the left as seen in FIG. 26 or FIG. 27.

It will suffice if the decrease in the mean value $m_{max}$ of maximum values is performed in accordance with the following equation, by way of example:

$$m_{max} \leftarrow m_{max} - (\text{upper-limit value} - \text{lower-limit value}) \times (5/100) \quad (52)$$

For example, if a value of 70 is given as the factor value $x_j$ in the membership function of factor $f_1$ of conclusion $c_2$, as shown in FIG. 27, then this will fall in the range of interval (e). Therefore, the mean value $m_{max}$ of maximum values is updated in accordance with the following equation:

$$m_{max} \leftarrow m_{max} - (\text{upper-limit value} - \text{lower-limit value}) \times \quad (53)$$
$$(5/100) = 75 - (100 - 0) \times (5/100) = 70$$

Figure 33:
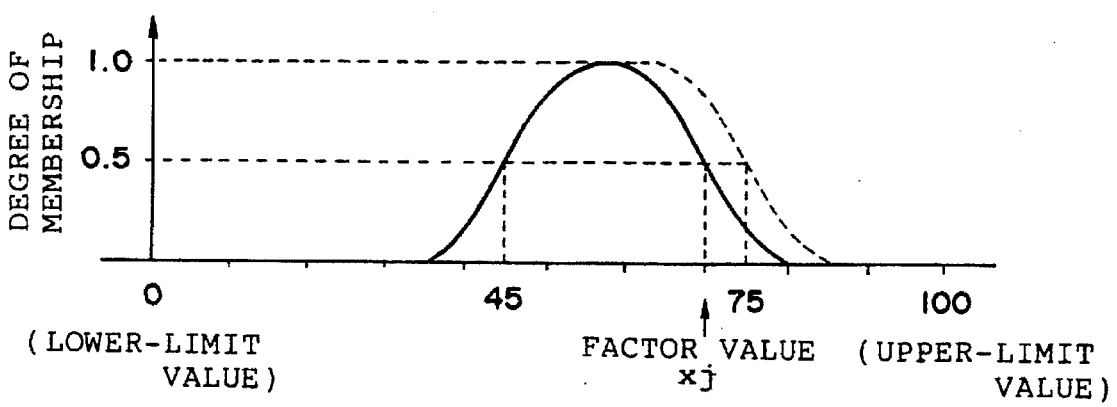

When the mean value $m_{max}$ of maximum values is thus decresed from 75 to 70 and a membership function is created using the updated mean value $m_{max}$=70, the result is as indicated by the solid line in FIG. 33. In comparison with the membership function before learning, as indicated by the dashed line in FIG. 33, the degree of membership at the factor value $x_j=70$ has been decreased.

(5) In a case where the factor value $x_j$ resides within the range of interval (f):

The standard deviation value $\sigma_{max}$ of maximum values is reduced and the slope of the membership function on the maximum side is enlarged.

It will suffice if the decrease in the standard deviation $\sigma_{max}$ of maximum values is performed in accordance with the following equation, by way of example:

$$\sigma_{max} \leftarrow \sigma_{max} \times 0.9 \quad (54)$$

Next, a specific algorithm for learning of a membership function will be described with reference to FIGS. 29 through 31.

Figure 29:
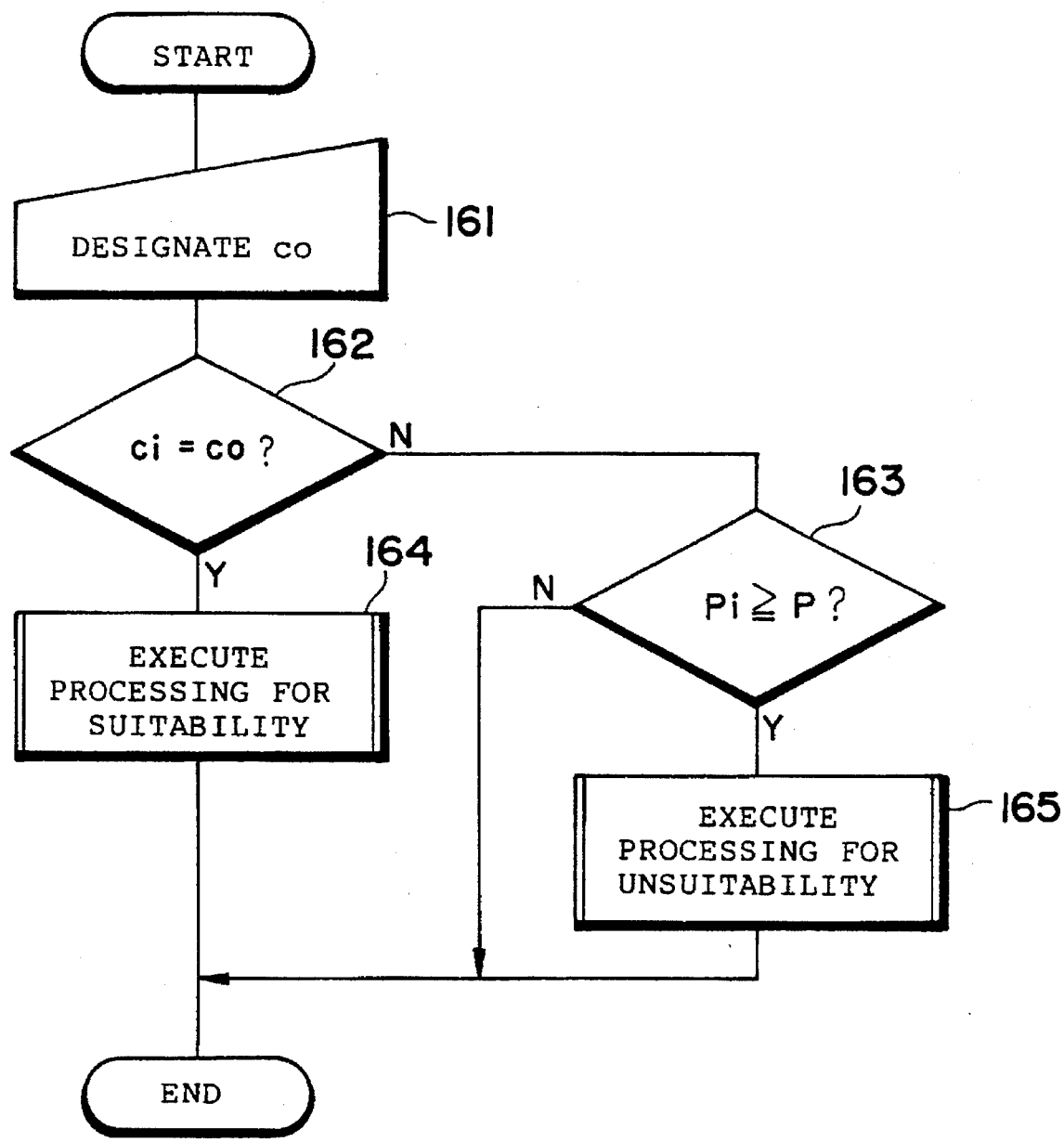
FIG. 29 is a flowchart showing the main routine of the learning algorithm of a membership function.

FIG. 29 illustrates the main routine of a learning algorithm for a membership function. The main routine is repeatedly execute for every conclusion ci. First, at step 161, the user employs the user input means 140 to designate a correct conclusion $c_0$ which is suitable. Next, at step 162, it is determined whether the conclusion $c_i$ has been designated as the correct conclusion $c_0$. If the answer at step 162 is YES, then the program proceeds to step 164; otherwise, the program proceeds to step 163.

Step 163 calls for a determination as to whether the possibility $P_i$ of conclusion $c_i$ is equal to or greater than the threshold value P. If $P_i \geq P$ holds, the program proceeds to step 165. In other words, the program proceeds to step 165 when, in spite of the fact that the conclusion $c_i$ has not been designated as the suitable conclusion $c_0$ by the user, the possibility $P_i$ of $c_i$ is equal to or greater than the threshold value P. This means that the conclusion $c_i$ is an unsuitable conclusion. Otherwise (NO at step 163), learning is not performed with regard to the conclusion $c_i$.

Figure 30:
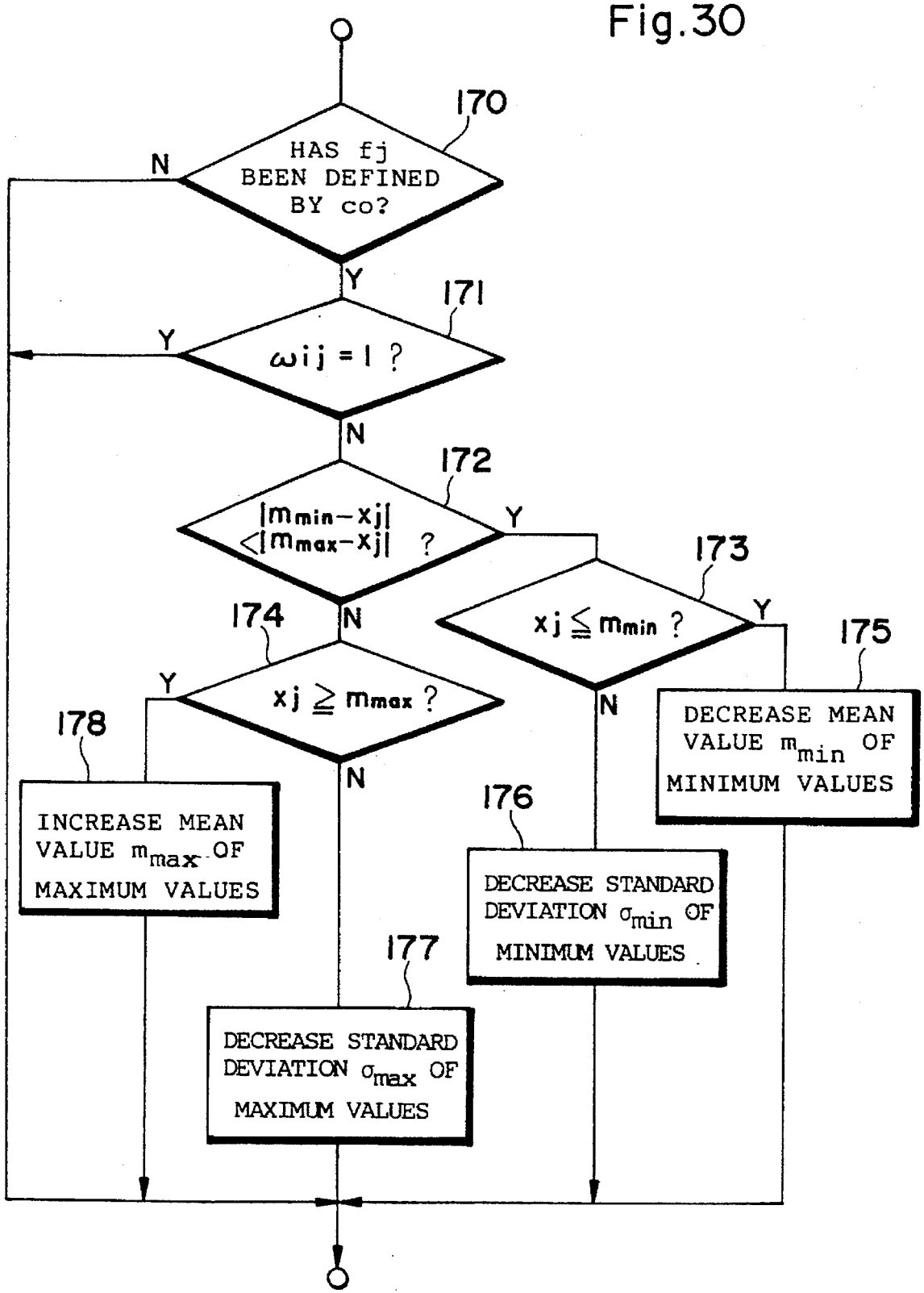
FIG. 30 is a flowchart showing a processing routine for when the membership function is suitable.
Figure 31:
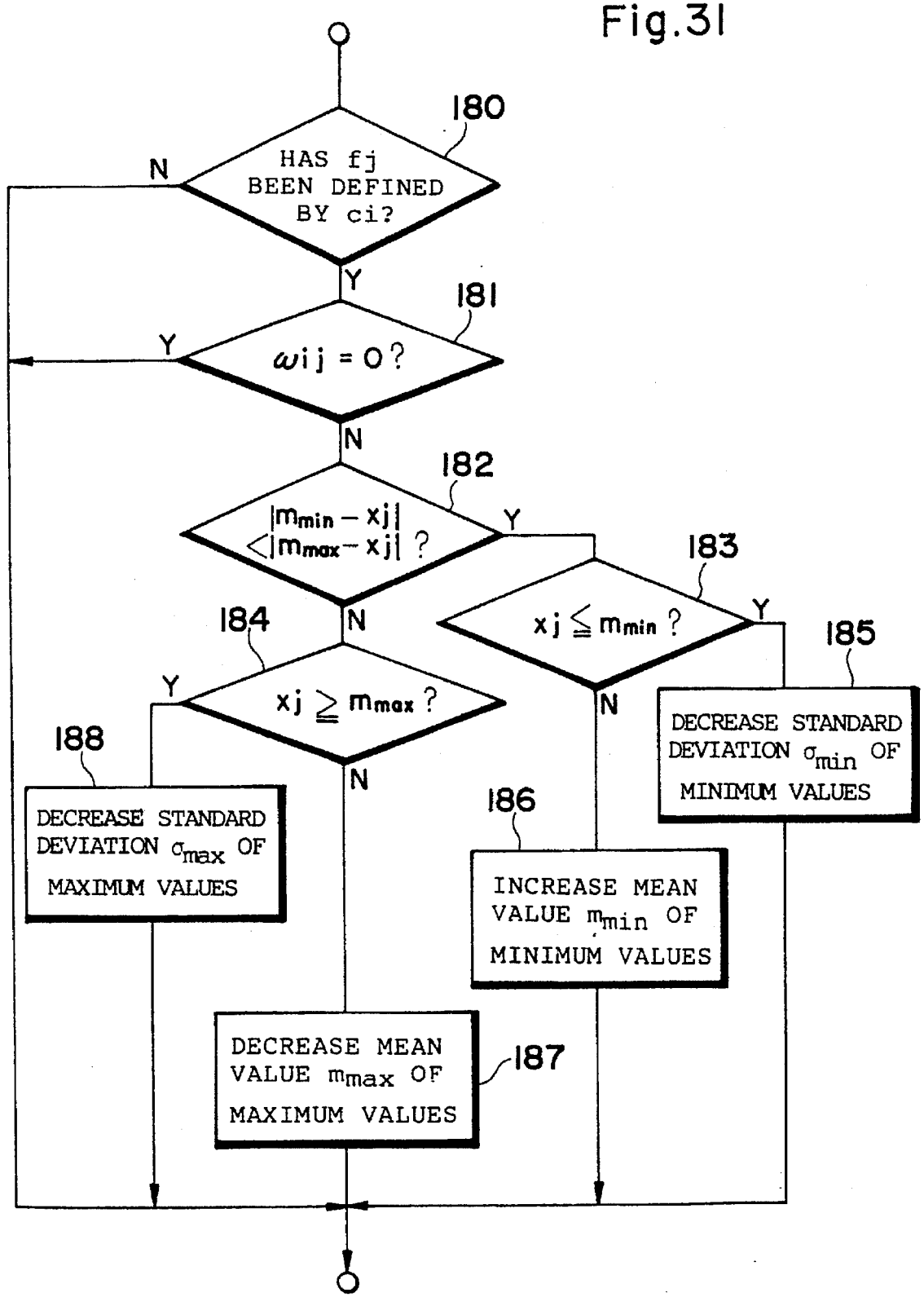
FIG. 31 is a flowchart showing a processing routine for when the membership function is not suitable.

Processing for when a conclusion is suitable is executed at step 164 in accordance with the flowchart of FIG. 30. The processing of step 165 for when a conclusion is not suitable is executed in accordance with the flowchart shown in FIG. 31.

Processing for when a conclusion is suitable will now be described with reference to FIG. 30. This processing is repeatedly executed with regard to all factors $f_j$. First, it is determined at step 170 whether the factor has been defined by the correct conclusion $c_0$. The program proceeds to step 171 only when the factor $f_j$ has been defined by the correct conclusion $c_0$. Otherwise, the routine is terminated. In other words, learning is performed only with regard to a factor $f_j$ associated with the correct conclusion $c_0$.

It is determined at step 171 whether a degree of membership $\omega_{ij}$ is 1. When $\omega_{ij}=1$ holds, namely when the factor value $x_j$ resides in the range of interval (d), no change is made and the routine is terminated as a result. Otherwise, the program proceeds from step 171 to step 172.

Which of the difference (absolute value) between the mean value $m_{min}$ of minimum values and the factor value $x_j$ and the difference (absolute value) between the mean value $m_{max}$ of maximum values and the factor value $x_j$ is larger is determined at step 172. If the absolute value of $m_{min}-x_j$ is less than the absolute value $m_{max}-x_j$, this means that the factor value $x_j$ is on the minimum side of the membership function, and the program proceeds to step 173. Otherwise, the factor value $x_j$ is on the maximum side of the membership value and the program proceeds to step 174.

It is determined at step 173 whether the factor value $x_j$ is equal to or less than the mean value $m_{min}$ on the minimum side. If $x_j \leq m_{min}$ holds, this means that the factor value $x_j$ resides in the range of interval (a) or (b), in which case the program proceeds to step 175. Otherwise, the factor value $x_j$ resides in the range of interval (c), in which case the program proceeds to step 176.

It is determined at step 174 whether the factor value $x_j$ is equal to or greater than the mean value $m_{max}$ on the maximum side. If $x_j \geq m_{max}$ holds, this means that the factor value $x_j$ resides in the range of interval (f) or (g), in which case the program proceeds to step 178. Otherwise, the factor value $x_j$ resides in the range of interval (e), in which case the program proceeds to step 177.

Step 175 is executed in case of (1) above and entails decreasing the mean value $m_{min}$ of minimum values.

Step 176 is executed in case of (2) above and entails decreasing the standard deviation $\sigma_{min}$ of minimum values.

Step 177 is executed in case of (4) above and entails decreasing the standard deviation $\sigma_{max}$ of maximum values.

Step 178 is executed in case of (5) above and entails increasing the mean value $m_{max}$ of maximum values.

Processing for when a conclusion is not suitable will now be described with reference to FIG. 31. This processing is repeatedly executed with regard to all factors $f_j$. First, it is determined at step 180 whether the factor has been defined by the conclusion $c_i$. The program proceeds to step 181 only when the factor $f_j$ has been defined by the conclusion $c_i$. Otherwise, the routine is terminated. In other words, learning is performed only with regard to a factor $f_j$ associated with the conclusion $c_i$.

It is determined at step 181 whether a degree of membership $\omega_{ij}$ is 0. When $\omega_{ij}=0$ holds, namely when the factor value $x_j$ resides in the range of interval (a) or (g), no change is made and the routine is terminated as a result. Otherwise, the program proceeds from step 181 to step 182.

Which of the difference (absolute value) between the mean value $m_{min}$ of minimum values and the factor value $x_j$ and the difference (absolute value) between the mean value $m_{max}$ of maximum values and the factor value $x_j$ is larger is determined at step 182. If the absolute value of $m_{min}-x_j$ is less than the absolute value $m_{max}-x_j$, this means that the factor value $x_j$ is on the minimum side of the membership function, and the program proceeds to step 183. Otherwise, the factor value $x_j$ is on the maximum side of the membership value and the program proceeds to step 184.

It is determined at step 183 whether the factor value $x_j$ is equal to or less than the mean value $m_{min}$ on the minimum side. If $x_j \leq m_{min}$ holds, this means that the factor value $x_j$ resides in the range of interval (b), in which case the program proceeds to step 185. Otherwise, the factor value $x_j$ resides in the range of interval (c) or (b), in which case the program proceeds to step 186.

It is determined at step 184 whether the factor value $x_j$ is equal to or greater than the mean value $m_{max}$ of maximum values. If $x_j \geq m_{max}$ holds, this means that the factor value $x_j$ resides in the range of interval (f), in which case the program proceeds to step 188. Otherwise, the factor value $x_j$ resides in the range of interval (d) or (e), in which case the program proceeds to step 187.

Step 185 is executed in case of (2) above and entails decreasing the standard deviation $\sigma_{min}$ of minimum values.

Step 186 is executed in case of (3) above and entails increasing the mean value $m_{min}$ of minimum values.

Step 187 is executed in case of (4) above and entails decreasing the mean value $m_{max}$ of maximum values.

Step 188 is executed is case of (5) above and entails decreasing the standard deviation $\sigma_{max}$ of maximum values.

In the above embodiment, the membership function learning unit 136 executes learning if the user has designated a correct conclusion. However, it is possible to adopt an arrangement in which the designated conclusion and the factor value at such time are stored in the learning data buffer 138 and learning is executed when the load on the CPU is light. In such case, the amount of load on the CPU can be reduced.

Figure 34:
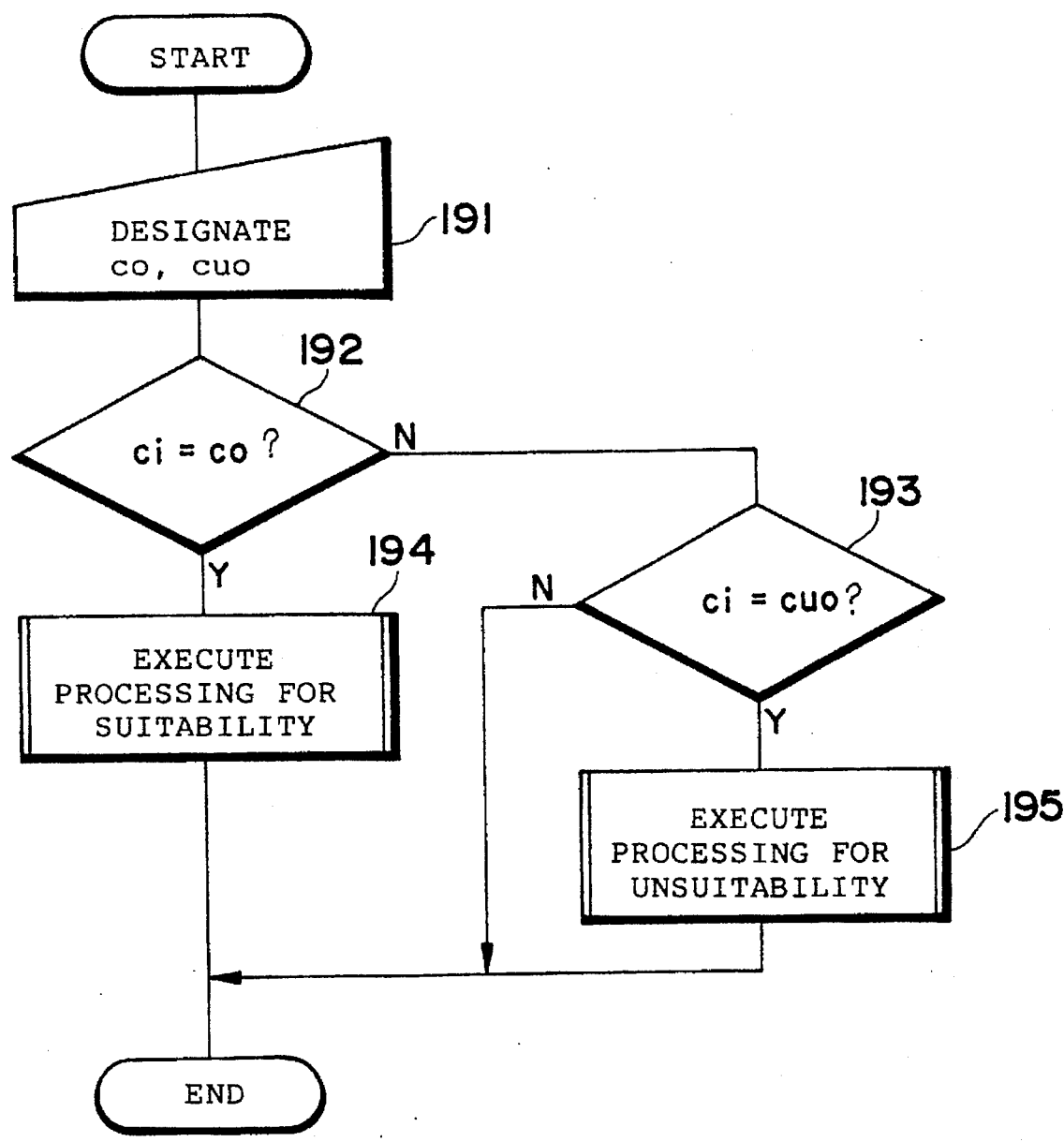
FIG. 34 is a flowchart showing another example of the subroutine of a membership-function learning algorithm.

In the embodiment described above, a conclusion which the user designates as being correct and a conclusion which, among the other conclusions, has a possibility equal to or greater than a certain threshold value, are adopted as the subject of learning of a membership function. However, a membership function to be learned can be a conclusion designated by the user to be correct and a conclusion designated by the user to be incorrect with regard to the outputted results of reasoning. In such case, as shown in FIG. 34, an incorrect conclusion $c_{u0}$ is designated in addition to the correct conclusion $c_0$, and instead of determining whether the possibility $P_i$, is equal to or greater than the threshold value P, it is determined at step 193 whether the conclusion $c_i$ is the conclusion $c_{u0}$ designated as being incorrect. If $c_i = c_{u0}$ holds, the program proceeds to step 195, where processing for dealing with an unsuitable conclusion is executed in the manner shown in FIG. 31.

The concept of possibility of conclusion and clarity is not limited to the concept thereof used in the above embodiments but is widely defined in various fashion.

As many apparently widely different embodiments of the present invention can be made without departing from the spirit and scope thereof, it is to be understood that the invention is not limited to the specific embodiments thereof except as defined in the appended claims.

What is claimed is:

1. An approximate reasoning apparatus comprising:

an input device for inputting a decision regarding the correctness of a result of reasoning performed based upon knowledge from a plurality of experts;

a selector for selecting which knowledge of an expert among the plurality thereof is to have its weight altered, based upon the decision regarding correctness inputted by said input device;

an arithmetic unit for calculating a new weight for the knowledge of the expert selected by said selector;

a memory unit for storing the new weight for the knowledge of the expert calculated by said arithmetic unit; and a knowledge re-synthesizing device for automatically re-synthesizing knowledge based upon the new weight by combining the knowledge of the expert with said new weight calculated by said arithmetic unit.

\* \* \* \* \*